(12) United States Patent
Bjornsson et al.

(10) Patent No.: US 9,009,437 B1
(45) Date of Patent: Apr. 14, 2015

(54) TECHNIQUES FOR SHARED DATA STORAGE PROVISIONING WITH THIN DEVICES

(75) Inventors: Magnus E. Bjornsson, Sudbury, MA (US); George Lettery, North Grafton, MA (US); David Meiri, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 291 days.

(21) Appl. No.: 13/134,875

(22) Filed: Jun. 20, 2011

(51) Int. Cl.
| | | |
|---|---|---|
| G06F 12/00 | (2006.01) | |
| G06F 13/00 | (2006.01) | |
| G06F 3/06 | (2006.01) | |
| G06F 11/14 | (2006.01) | |

(52) U.S. Cl.
CPC .......... G06F 3/0665 (2013.01); *G06F 11/1453* (2013.01); *G06F 3/0664* (2013.01); *G06F 3/0662* (2013.01); G06F 3/0641 (2013.01)

(58) Field of Classification Search
USPC .......................................................... 711/161
See application file for complete search history.

(56) References Cited

U.S. PATENT DOCUMENTS

| | | | | |
|---|---|---|---|---|
| 6,823,442 | B1 * | 11/2004 | Cameron ...................... | 711/220 |
| 7,587,492 | B2 * | 9/2009 | Dyck et al. .................... | 709/226 |
| 7,613,896 | B2 * | 11/2009 | Yamamoto et al. ........... | 711/171 |
| 7,631,155 | B1 * | 12/2009 | Bono et al. .................... | 711/156 |
| 7,694,082 | B2 * | 4/2010 | Golding et al. ................ | 711/154 |
| 7,747,837 | B2 * | 6/2010 | Gorobets et al. .............. | 711/203 |
| 7,769,978 | B2 * | 8/2010 | Gorobets et al. .............. | 711/203 |
| 7,822,939 | B1 * | 10/2010 | Veprinsky et al. ............ | 711/170 |
| 7,917,722 | B2 * | 3/2011 | Yamamoto et al. ........... | 711/171 |
| 8,054,832 | B1 * | 11/2011 | Shukla et al. .................. | 370/389 |
| 8,127,096 | B1 * | 2/2012 | Chatterjee et al. ............ | 711/162 |
| 8,161,262 | B2 * | 4/2012 | Yamamoto et al. ........... | 711/171 |
| 8,190,769 | B1 * | 5/2012 | Shukla et al. .................. | 709/238 |
| 8,291,159 | B2 * | 10/2012 | Rajagopal et al. ............ | 711/111 |
| 8,307,186 | B2 * | 11/2012 | Ando et al. .................... | 711/171 |
| 8,331,362 | B2 * | 12/2012 | Shukla et al. .................. | 370/389 |
| 8,332,600 | B2 * | 12/2012 | Ito et al. ......................... | 711/162 |
| 8,336,047 | B2 * | 12/2012 | Van Hensbergen ............... | 718/1 |
| 8,346,727 | B1 * | 1/2013 | Chester et al. ................ | 707/640 |
| 8,359,444 | B2 * | 1/2013 | Arakawa ....................... | 711/165 |

(Continued)

OTHER PUBLICATIONS

VMware Distributed Resource Scheduler (DRS), VMware, Inc., copyright 2009, retrieved from http://www.vmware.com/files/pdf/VMware-Distributed-Resource-Scheduler-DRS-DS-EN.pdf on Jun. 20, 2013 (3 pages).*

(Continued)

*Primary Examiner* — Sanjiv Shah
*Assistant Examiner* — Daniel C Chappell
(74) *Attorney, Agent, or Firm* — Muirhead and Saturnelli, LLC

(57) ABSTRACT

Described are techniques for performing data storage management. A first data portion is stored at a first logical address of a first device that is mapped to a first physical storage location at which the first data portion is stored. A second data portion is stored at a second logical address on a second device that is mapped to a second physical storage location at which the second data portion is stored. The first data portion is a duplicate of data contents of the second data portion and the first physical storage location is the same physical storage location as the second physical storage location. The first device and the second device are thin devices where physical storage is unallocated for at least a portion of each thin device's storage capacity at a point in time.

14 Claims, 23 Drawing Sheets

(56) References Cited

U.S. PATENT DOCUMENTS

| | | | | |
|---|---|---|---|---|
| 8,407,436 B2* | 3/2013 | Arakawa | | 711/162 |
| 8,504,531 B2* | 8/2013 | Ambat et al. | | 707/692 |
| 8,572,338 B1* | 10/2013 | Marathe et al. | | 711/162 |
| 8,578,087 B2* | 11/2013 | Acedo et al. | | 711/112 |
| 8,578,092 B2* | 11/2013 | Arakawa | | 711/114 |
| 8,892,847 B2* | 11/2014 | Imazaki et al. | | 711/209 |
| 2007/0234342 A1* | 10/2007 | Flynn et al. | | 717/174 |
| 2007/0245116 A1* | 10/2007 | Yamamoto et al. | | 711/172 |
| 2008/0126734 A1* | 5/2008 | Murase | | 711/170 |
| 2008/0201455 A1* | 8/2008 | Husain | | 709/220 |
| 2009/0063528 A1* | 3/2009 | Yueh | | 707/101 |
| 2009/0063795 A1* | 3/2009 | Yueh | | 711/162 |
| 2009/0070541 A1 | 3/2009 | Yochai | | |
| 2009/0172666 A1* | 7/2009 | Yahalom et al. | | 718/1 |
| 2010/0191923 A1* | 7/2010 | Archer et al. | | 711/154 |
| 2010/0199037 A1* | 8/2010 | Umbehocker et al. | | 711/113 |
| 2010/0299306 A1* | 11/2010 | Agetsuma et al. | | 707/609 |
| 2010/0299495 A1* | 11/2010 | Frank | | 711/170 |
| 2010/0306467 A1* | 12/2010 | Pruthi et al. | | 711/114 |
| 2011/0264855 A1* | 10/2011 | Kasako | | 711/114 |
| 2012/0254353 A1* | 10/2012 | Baba et al. | | 709/217 |

OTHER PUBLICATIONS

Level of Indirection solves every Problem, user6288, Nov. 13, 2008, retrieved from http://stackoverflow.com/questions/288623/level-of-indirection-solves-every-problem on Jun. 13, 2014 (1 page).*

Definition of computer, Free Online Dictionary of Computing, 1995, retrieved from http://foldoc.org/computer on Jun. 13, 2014 (1 page).*

Meiri, David, "VM Mobility Over Distance," U.S. Appl. No. 12/932,080, filed Feb. 17, 2011.

* cited by examiner

TECHNIQUES FOR SHARED DATA STORAGE PROVISIONING WITH THIN DEVICES

BACKGROUND

1. Technical Field

This application generally relates to data storage, and more particularly to techniques used in connection with shared data storage provisioning.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

When making a target device that is a copy of data of a source device, additional storage may be allocated and associated with the target device. Data may be copied from a first set of physical storage locations of the source device to a second set of additionally allocated storage locations. Thus, each of the source and target devices has a separate set of physical storage locations.

SUMMARY OF THE INVENTION

In accordance with one aspect of the invention is a method for performing data storage management comprising storing a first data portion at a first logical address of a first device, wherein said first logical address is mapped to a first physical storage location at which the first data portion is stored, wherein said first device is a thin device having a first storage capacity and wherein storage is unallocated for at least a first portion of said first storage capacity at a point in time, said first portion corresponding to a range of addresses of said first logical address space not mapped to physical storage; and storing a second data portion at a second logical address on a second device, wherein said second logical address is mapped to a second physical storage location at which the second data portion is stored, and wherein said first data portion is a duplicate of data contents of said second data portion and said first physical storage location is a same physical storage location as said second physical storage location, wherein said second device is a thin device having a second storage capacity and wherein storage is unallocated for at least a second portion of said second storage capacity at a point in time, said second portion corresponding to a range of addresses of said second logical address space not mapped to physical storage. The first logical address may be different from the second logical address, and the first device may be a same logical device as said second device. The first device may be different logical device than the second device and the first logical address may be different from the second logical address. The first device and the second device may be different logical devices and the first logical address may be a same logical address as the second logical address. The method may also include receiving a write operation to write new data to the first logical address of the first device, storing said new data at a third physical storage location, and mapping said first logical address to said third physical storage location. The new data may have a size less than a predetermined size of said first data portion and the method may include storing said first data portion at said third physical storage location and then overwriting said new data onto said first data portion at said third physical storage location. the first device may have an allocation pointer mapping said first logical address to said first physical storage location. The method may include receiving a read operation to read data of said second logical address of said second device and retrieving the second data portion to service said read operation. The step of retrieving may include using a first pointer mapping said second logical address of said second device to the first logical address of the first device to obtain said allocation pointer; and using said allocation pointer to obtain the second data portion which is a duplicate of data of said first data portion. The first device may have a first allocation pointer mapping said first logical address to said first physical storage location and said second device may have a second allocation pointer mapping said second logical address to said second physical storage location that is the same as said first physical storage location. The method may include receiving a first read operation to read data of said first logical address of said first device, retrieving the first data portion to service said first read operation using said first allocation pointer, receiving a read operation to read data of the second logical address of the second device, and retrieving the second data portion that is the same as said first data portion to service said second read operation using said second allocation pointer. The method may include performing first processing to determine that the first data portion is a duplicate of data contents of the second data portion. The first processing may include receiving hint information indicating that the first data portion stored at said first logical address of said first device is a duplicate of data contents of said second data portion stored at the second logical address of the second device, and performing processing using the hint information to store said first data portion and said second data portion at the same physical storage location. The first processing may include determining a first token value uniquely identifying said first data portion, determining a second token value uniquely identifying said second data portion, and comparing said first token value and said second token value to determine whether the first data portion is a duplicate of the second data portion. The method may include receiving hint information indicating that the first data portion and the second data portion are candidates likely to be redundant data portions including the same data content, and performing processing using the hint information to determine whether the first data portion and the second data portion contain the same data content and, if so, storing the same data contents of said first data portion and said second data portion at the same physical storage location.

In accordance with another aspect of the invention is a method for relocating data from a first device to a second device comprising storing a first data portion at a first logical address of a first device, wherein said first logical address is mapped to a first physical storage location on a first physical storage device at which the first data portion is stored, wherein said first device is a thin device having a first storage capacity and wherein storage is unallocated for at least a first portion of said first storage capacity at a point in time, said first portion corresponding to a range of addresses of said first logical address space not mapped to physical storage; and receiving a command to copy said first data portion to a second logical address on a second device, wherein copying said first data portion to said second logical address on the second device includes mapping said second logical address to said first physical storage location, said second device being a thin device having a second storage capacity and wherein storage is unallocated for at least a second portion of said second storage capacity at a point in time, said second portion corresponding to a range of addresses of said second logical address space not mapped to physical storage. The first data portion of the first device may be used by a virtual machine having data of the virtual machine relocated to said second data portion of the second device. The method may include deallocating the first data portion of the first device, said deallocating including unmapping said first logical address from said first physical storage location. Prior to receiving the command to copy the first data portion, the virtual machine may be executing on a first processor of a first data storage system including a first physical device, said first physical device including the first physical storage location. The method may include relocating the virtual machine from the first data storage system to execute on a second processor of a second data storage system, said relocating including issuing said command to copy said first data portion to the second logical address on the second device, wherein, after performing said relocating, said virtual machine executes on said second processor and accesses said first data portion stored at the first physical storage location on the first physical storage device of the first data storage system using said second device.

In accordance with another aspect of the invention is a computer readable medium comprising code stored thereon for performing data storage management, the computer readable medium comprising code for: storing a first data portion at a first logical address of a first device, wherein said first logical address is mapped to a first physical storage location at which the first data portion is stored, wherein said first device is a thin device having a first storage capacity and wherein storage is unallocated for at least a first portion of said first storage capacity at a point in time, said first portion corresponding to a range of addresses of said first logical address space not mapped to physical storage; and storing a second data portion at a second logical address on a second device, wherein said second logical address is mapped to a second physical storage location at which the second data portion is stored, and wherein said first data portion is a duplicate of data contents of said second data portion and said first physical storage location is a same physical storage location as said second physical storage location, wherein said second device is a thin device having a second storage capacity and wherein storage is unallocated for at least a second portion of said second storage capacity at a point in time, said second portion corresponding to a range of addresses of said second logical address space not mapped to physical storage. The first logical address may be different from the second logical address, and the first device may be a same logical device as said second device. The first device may be a different logical device than the second device and the first logical address may be different from the second logical address. The first device and the second device may be different logical devices and the first logical address may be a same logical address as the second logical address. The computer readable medium may also include code for receiving a write operation to write new data to the first logical address of the first device, storing said new data at a third physical storage location, and mapping said first logical address to said third physical storage location.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
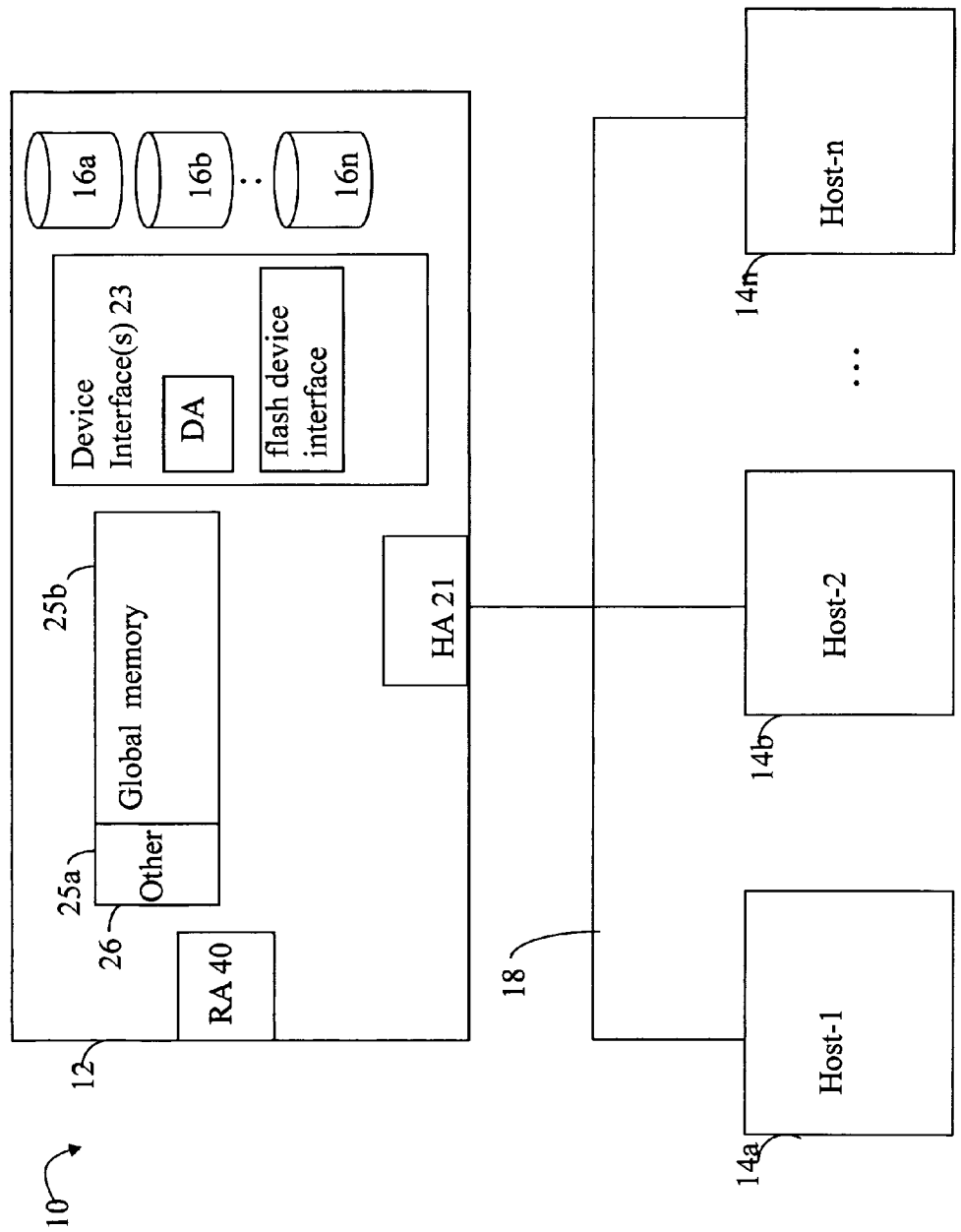
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more solid state drives (SSDs) and/or one or more disk drives (e.g., SATA drives and others which are non-SSD drives). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. Multiple logical devices or LVs may also be concatenated and appear to the host as a single metavolume. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, may physically access portions of a physical storage device in connection with performing I/O operations on a drive 16a-16n. Data residing on an LV may be accessed by the device interface following a data request in connection with I/O operations that other directors originate. Data may be accessed by LV in which a single device interface manages data requests in connection with the different one or more LVs that may reside on a drive 16a-16n.

Figure 2:
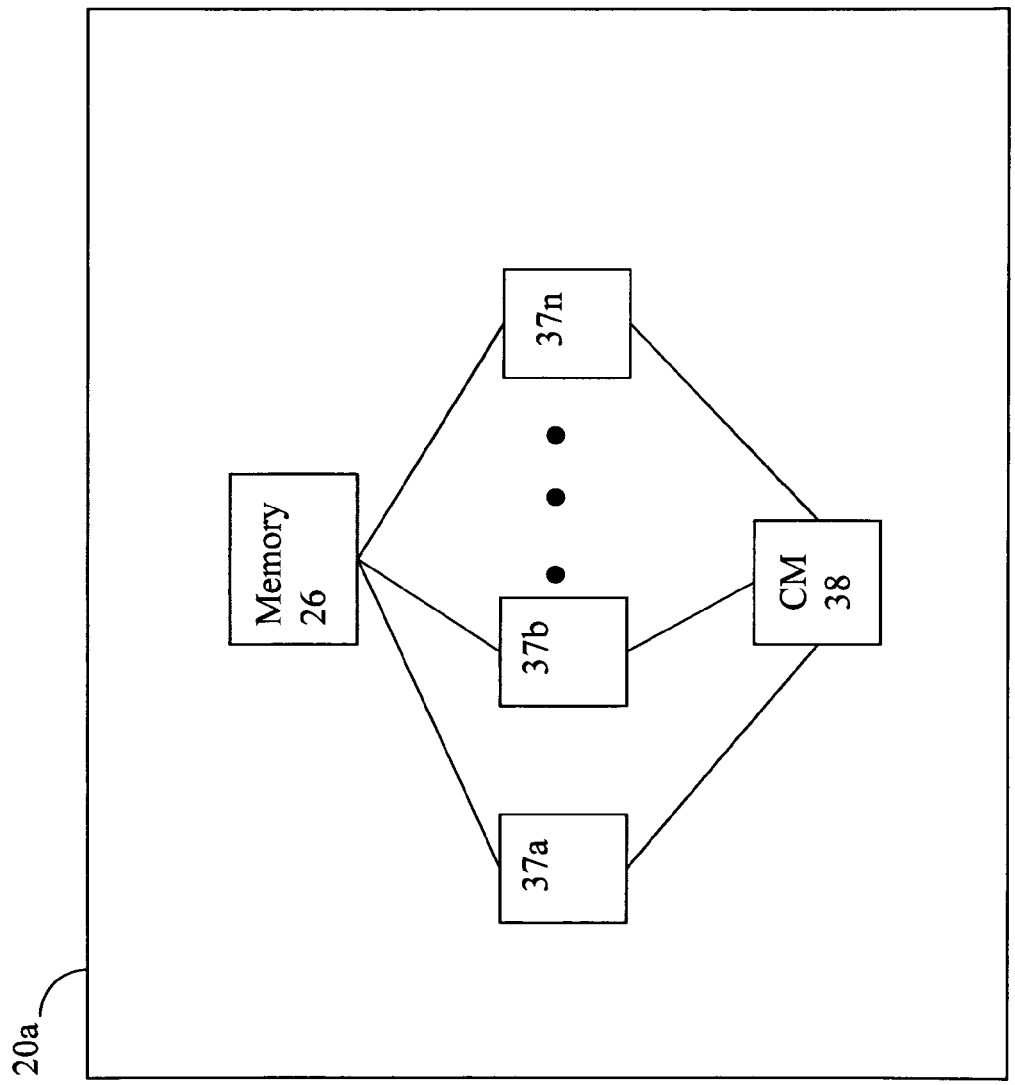
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® VMAX™ data storage array by EMC Corporation of Hopkinton, Mass. In the foregoing data storage array, the data storage devices 16a-16n may include a combination of disk devices (e.g., non-SSD storage devices) and flash devices (e.g., SSD-based storage devices) in which the flash devices may appear as standard Fibre Channel (FC) drives to the various software tools used in connection with the data storage array.

It should be noted that the I/O operations received, such as by an FA of the data storage system from a host, may be directed to a logical device or volume (LVs), a thin device, and the like. Such host I/O requests may result in corresponding read and write requests or commands to the DA, controller or other backend physical device interface. As described in more detail in following paragraphs, a thin device may be characterized as logical device providing virtual provisioning that allows more storage capacity to be presented to a host, or an application thereon, than is physically available. Virtual provisioning in connection with thin devices may provide for allocating underlying physical storage for the thin device only when the storage is actually written to.

Figure 3A:
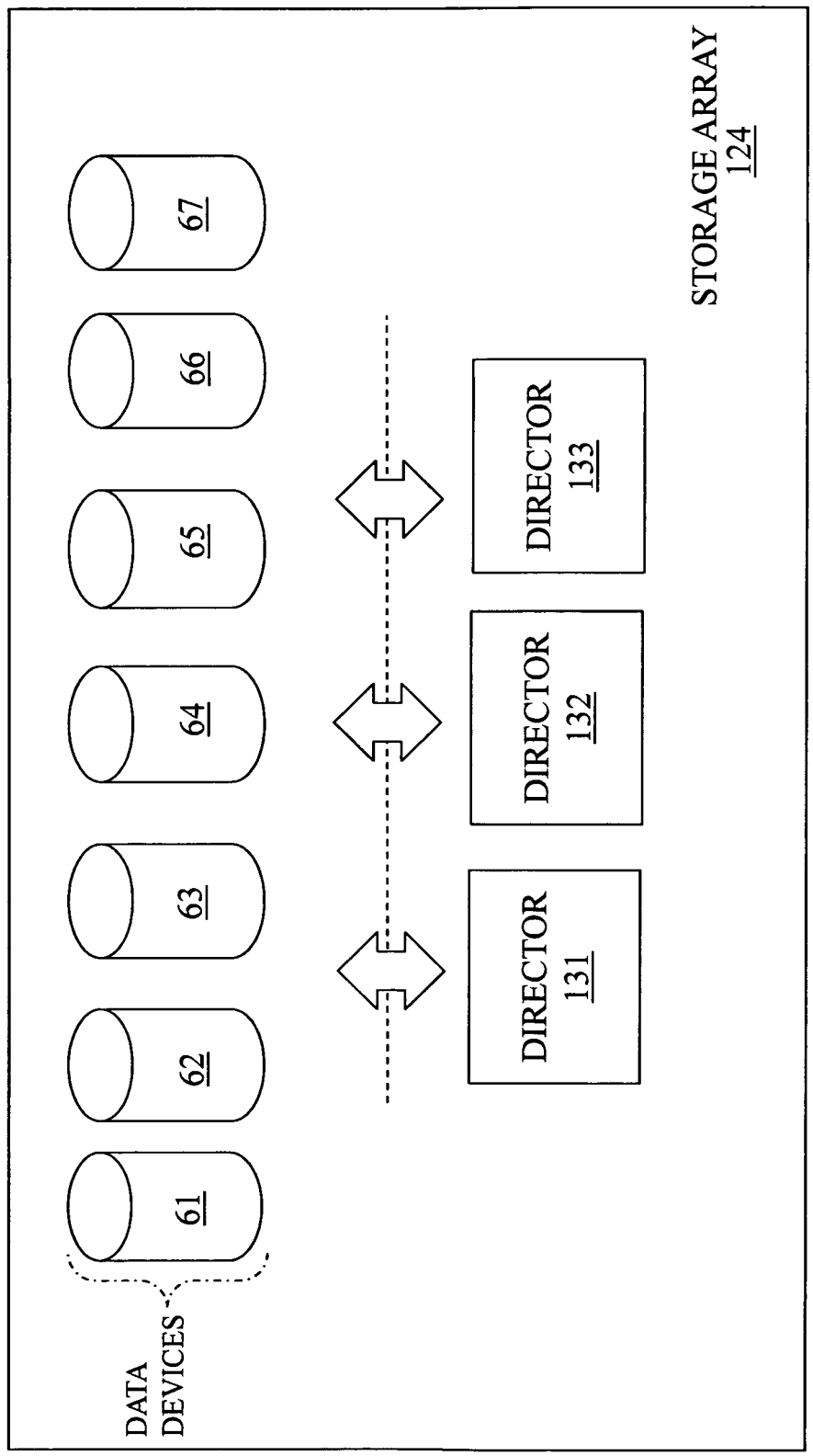
FIGS. 3A, 3B, and 3C illustrate data devices and thin devices that may be used in an embodiment in accordance with techniques herein.

Referring to FIG. 3A, shown is a schematic diagram of the data storage array 124 as including a plurality of data devices 61-67 communicating with directors 131-133. The data devices 61-67 may be implemented as logical devices like standard logical devices (also referred to as thick devices) provided in a Symmetrix® data storage system produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more disk drives. Thus, for example, the data device section 61 may correspond to an entire disk drive or physical storage device, may correspond to a portion of the physical disk drive or other physical device, or may correspond to a first portion of a first physical device and a second portion of a different physical device.

Figure 3B:
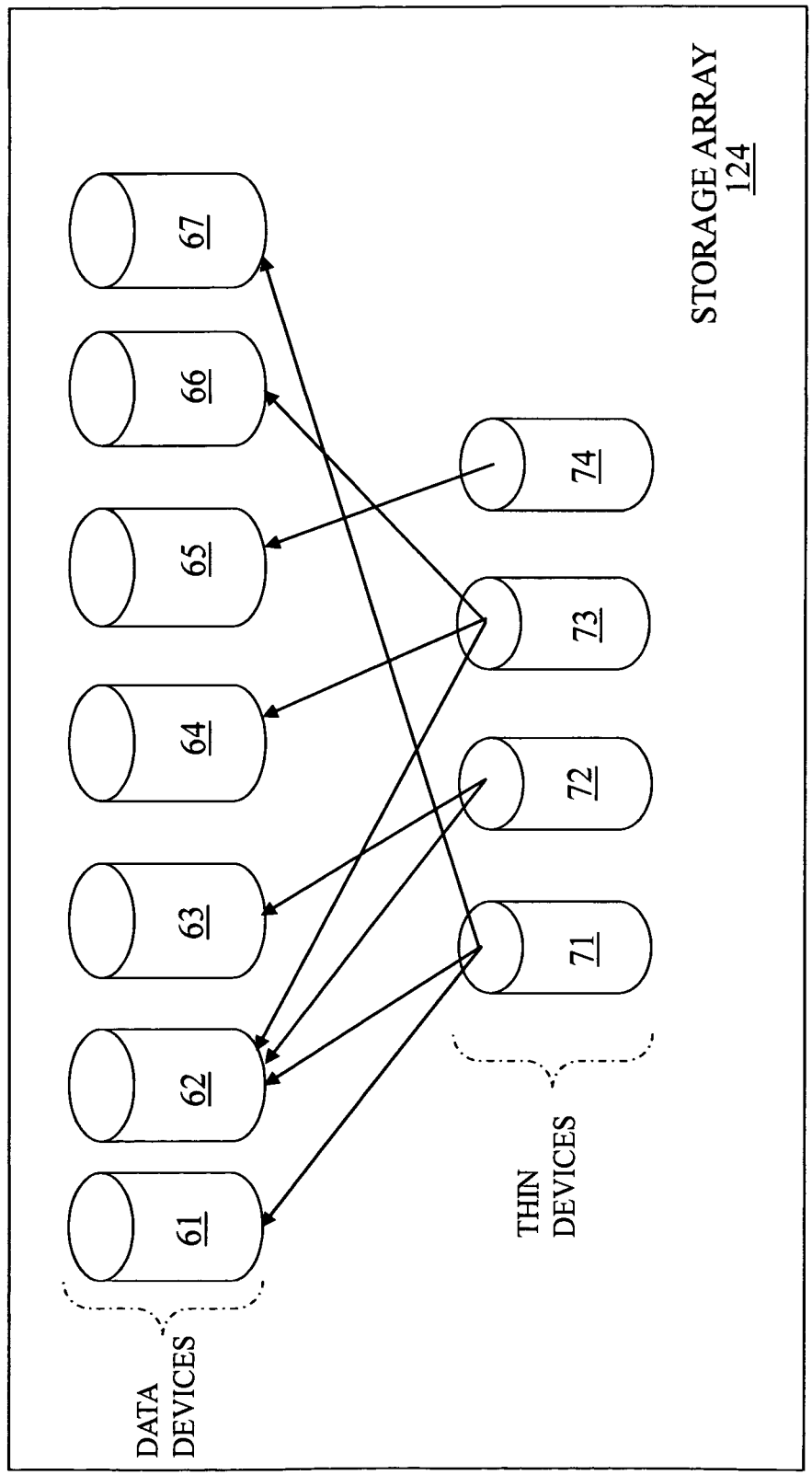

As shown in FIG. 3B, the storage array 124 may also include a plurality of thin devices 71-74 that may be used in connection with the system described herein with thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). For example, thin device 71 may have data stored on portions of data devices 61, 62 and 67 (or portions of such data devices), and thin device 74 may have data stored on data device 65 (or portions thereof).

In an embodiment in accordance with techniques herein, multiple thin devices may share a same set of one or more physical storage locations. For example, multiple thin devices may reference a same group of physical tracks comprising a single allocated storage chunk if all such thin devices contain the same data as stored in the single chunk. This sharing of physical storage among thin devices containing the same data may result in saving physical storage space, for example, over other systems which do not allow such sharing of backend storage among thin devices.

Figure 3C:
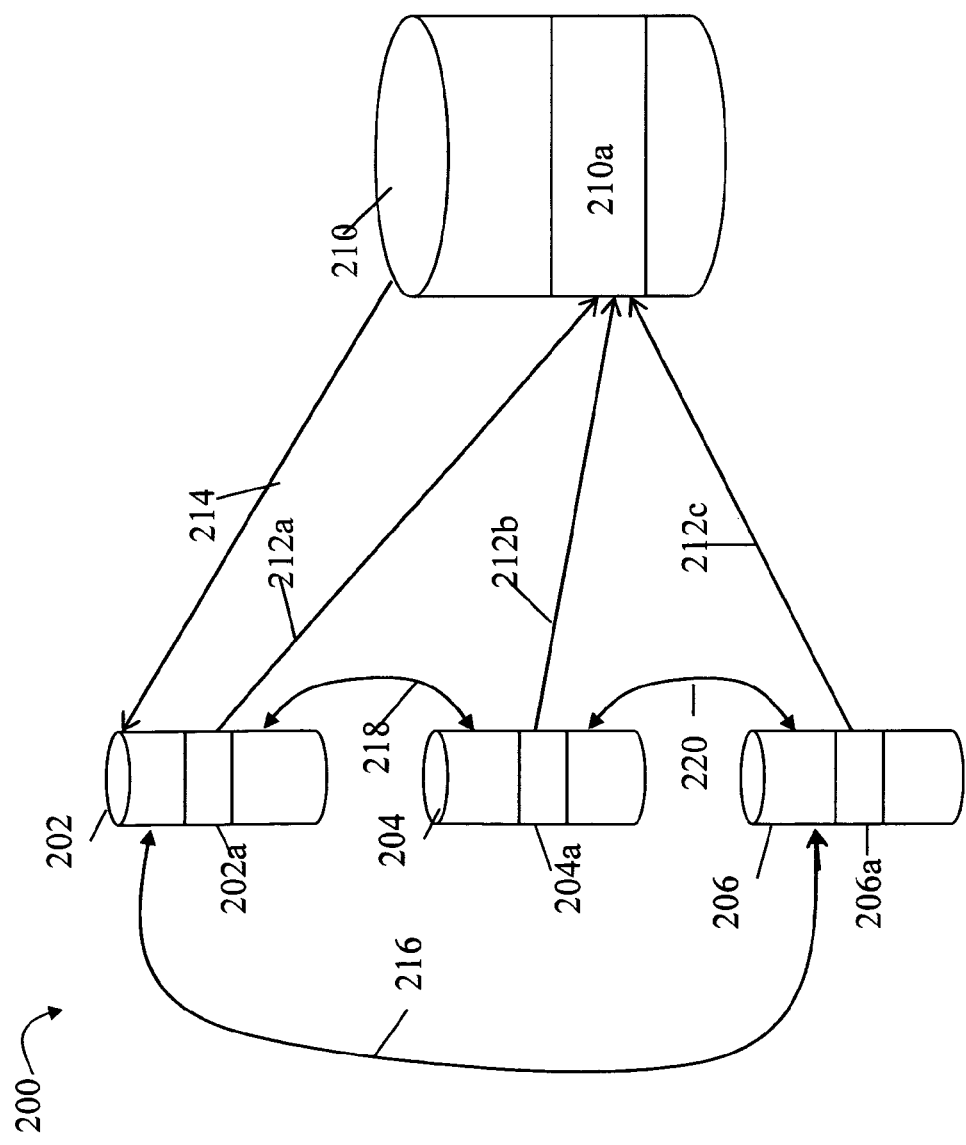

Referring to FIG. 3C, shown is an example illustrating use of shared physical storage among thin devices in an embodiment in accordance with techniques herein. The example 200 includes thin devices 202, 204 and 206 and data device 210. Each of the thin devices 202, 204 and 206, respectively, include a data portion 202a, 204a, 206a which is mapped to a same physical storage location denoted by 210a of data device 210. Arrows 212a, 212b, and 212c indicate the mapping between each of the thin devices 202, 204 and 206 and the data device 210. In connection with management of shared storage allocation among thin devices, an embodiment may also utilize other information. Such information may include that as represented by arrows 214, 216, 218, and 220. Arrows 216, 218 and 220 represent a doubly linked list of thin devices sharing a same physical storage allocation 210a. Information regarding the linked list may be maintained in connection with information for the thin devices 202, 204 and 206. Arrow 214 may identify a first such entry on the linked list as may be maintained in connection with information for the data device 210. The foregoing is described in more detail elsewhere herein.

It should be noted that the LBA offset or location of each of 202a, 204a and 206 within the thin devices may be the same or may be different depending on the usage of the thin devices 202, 204 and 206. Furthermore, as described in more detail elsewhere herein, two thin device portions which contain the same data contents stored at a shared physical location may be located on two different thin devices or on the same thin device but at two different logical addresses or locations of the single thin device. This is described in more detail elsewhere herein.

Figure 3D:
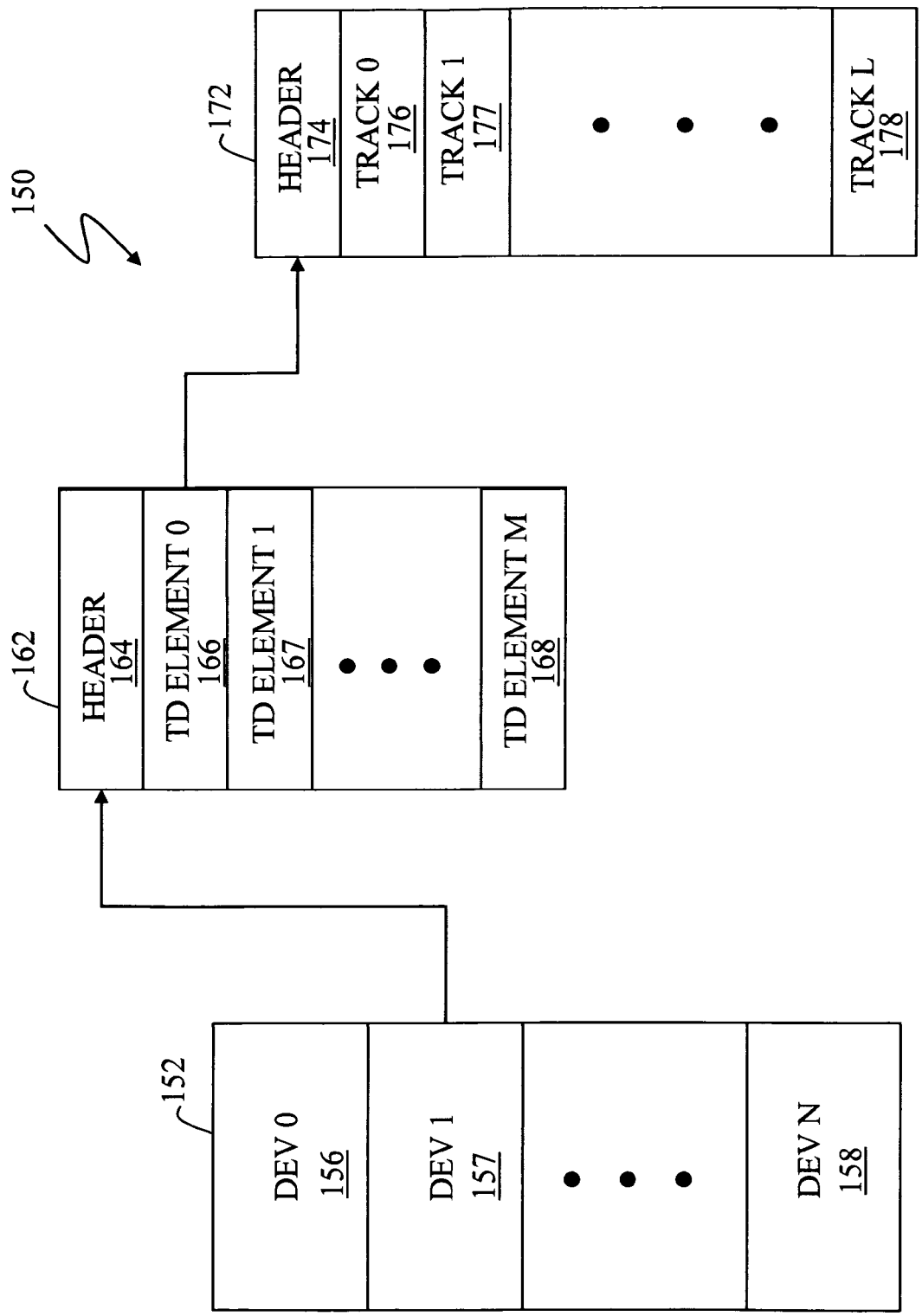
FIG. 3D is a schematic diagram illustrating tables that are used to keep track of device information in connection with an embodiment of the system described herein.

Referring to FIG. 3D, shown is a diagram 150 illustrating tables that are used to keep track of device information. A first table 152 corresponds to all of the devices used by a data storage system or by an element of a data storage system, such as an HA and/or a DA. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group may have sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The header 164 for a thin device may also include information used in connection with managing shared thin device storage allocations. For example, thin devices forming a thin device group that share a same physical storage allocation (e.g., such thin devices sharing a group of tracks for a same chunk of physical storage allocated) may be included on a doubly linked list. If a first thin device is included on such a linked list forming the thin device group, the first thin device's header 164 may include information (e.g., an address or pointer to) identifying the previous and next thin devices of the linked list of thin devices sharing physical storage allocation. The header 164 may also identify a number of shared allocation units such as a total number of tracks of physical storage provisioned for the thin device which are shared by one or more other thin devices of the thin device group, and may include an identifier associated with this particular thin device where a different identifier may be assigned to each thin device member of the thin device group. Each thin device sharing a same group of tracks may include a single TD element such as 166 identifying the same group of tracks. The linked list described in connection with the header 164 may be the doubly linked list of all thin devices in the thin device group referencing that same group of tracks.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 3E:
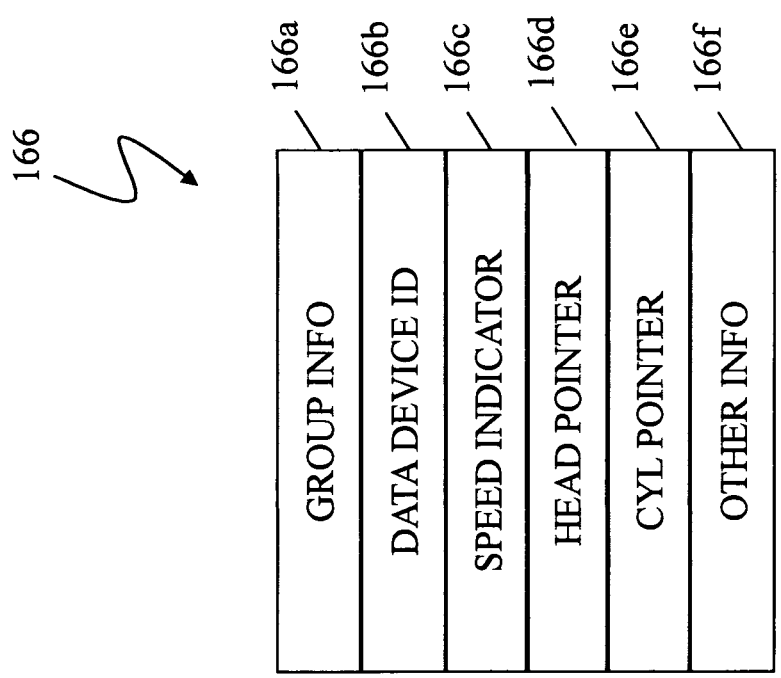
FIG. 3E is a schematic diagram showing a group element of a thin device table in connection with an embodiment of the system described herein.

Referring to FIG. 3E, shown is a schematic diagram illustrating a group element 166 of the thin device table 162 in connection with an embodiment of the system described herein. The group element 166 may includes a plurality of entries 166a-166f. The entry 166a may provide group information, such as a group type that indicates whether there has been physical address space allocated for the group, and whether the physically allocated space is also shared by multiple thin devices. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device.

Accordingly, a thin device presents a logical storage space having a corresponding logical address range (e.g., such as LBAs or logical block addresses) presented to one or more applications running on a host where different portions of the logical storage space may or may not have corresponding physical storage space associated therewith. However, the thin device may not be mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, and U.S. patent application Ser. No. 11/903,869, filed Sep. 25, 2007, DATA DE-DUPLICATION USING THIN PROVISIONING, Veprinsky et al., both of which are incorporated by reference herein.

With reference back to FIG. 3D, in a manner similar to that as illustrated for a thin device, an entry of the table 152 may also be associated with a data device rather than a thin device. For example, if entry 158 corresponds to a data device, entry 158 may point to an instance of a table similar to 162 described herein for thin devices. Such a table 162 for a data device may similarly include a header 164 and a plurality of entries 166, 167, . . . 168—one such entry for each group of allocated tracks of the data device. In one embodiment, the entry 166 for a data device's track group may indicate, for example, whether the track group is shared, may identify (e.g., point to) the first thin device in the doubly linked list of thin devices forming the thin device group that share the track group, may include a bit mask of thin device identifiers that share the particular track group as a shared allocation, and may identify the tracks included in the track group.

As discussed elsewhere herein with reference to FIG. 3B, the data devices 61-67 (such as LVs or other logical devices) may be associated with physical storage areas (e.g., disk drives, tapes, solid state storage, etc.). The devices 61-67 may appear to a host coupled to the storage device 24 as a logical volume (logical device) containing a contiguous block of data storage, as discussed herein. Accordingly, each of the devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume.

As described above, a thin device is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device may be constructed of chunks or extents having a size that may vary with embodiment. For example, in one embodiment, a chunk may correspond to a group of 12 tracks (e.g., 12 tracks*64Kbytes/track=768Kbytes/chunk). As also noted with a thin device, the different chunks may reside on the same and/or different data devices. In one embodiment, as will be described below, one or more storage pools may be formed in which each such storage pool may include multiple LVs (data devices) and their associated physical devices. With thin devices, a system in accordance with techniques herein has flexibility to locate individual chunks as desired to different devices in the same as well as different pools. In one embodiment using techniques herein, a thin device can be bound to a particular storage pool at a point in time so that any chunks requiring allocation of additional storage, such as may occur when writing data to the thin device, result in allocating storage from this storage pool. Such binding may change over time for a thin device.

It should be noted that a thin device may not be not usable until it has been bound to a shared storage pool which may also be referred to as a thin pool. In some embodiments, multiple thin devices may be bound to any given thin pool. When a write is performed to a part of any thin device for which physical storage has not yet been allocated, the storage system allocates physical storage from the thin pool for that portion of the thin device only. As noted above, the minimum amount of physical storage that can be allocated at a time for the dedicated use of a thin device may be referred to as a chunk or extent where the physical storage for the chunk or extent is physically allocated to the thin device as needed such as, for example, as a result of processing a received host write operation. The extent may be allocated from any one of the data devices in the associated thin pool to which the thin device is bound. Within a pool, allocations across the data devices may be balanced to ensure that an even distribution of allocations occurs from all available data devices in the thin pool. When a read is performed on a thin device, the data read is retrieved from the appropriate data device in the thin pool to which the thin device is associated. If for some reason a read is performed against an unallocated portion of the thin device, zeroes are returned to the reading process. When more physical data storage is required to service existing or future thin devices, for example, when a thin pool is approaching full storage allocations, data devices can be added to existing thin pools dynamically without needing a system outage. New thin devices can also be created and associated with existing thin pools.

Figure 4A:
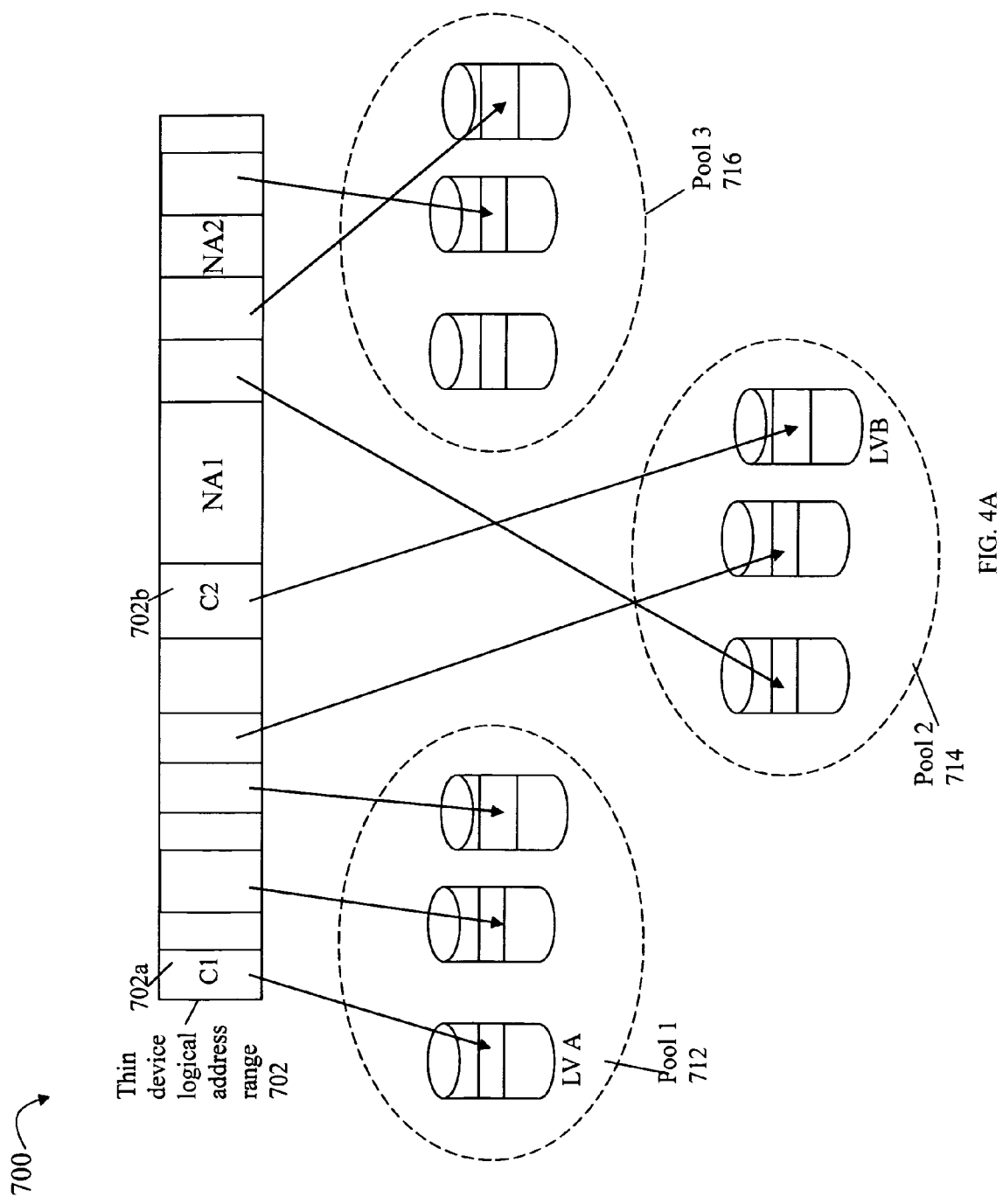
FIG. 4A is an example illustrating mapping to storage pools as may be performed for a thin device.
Figure 4B:
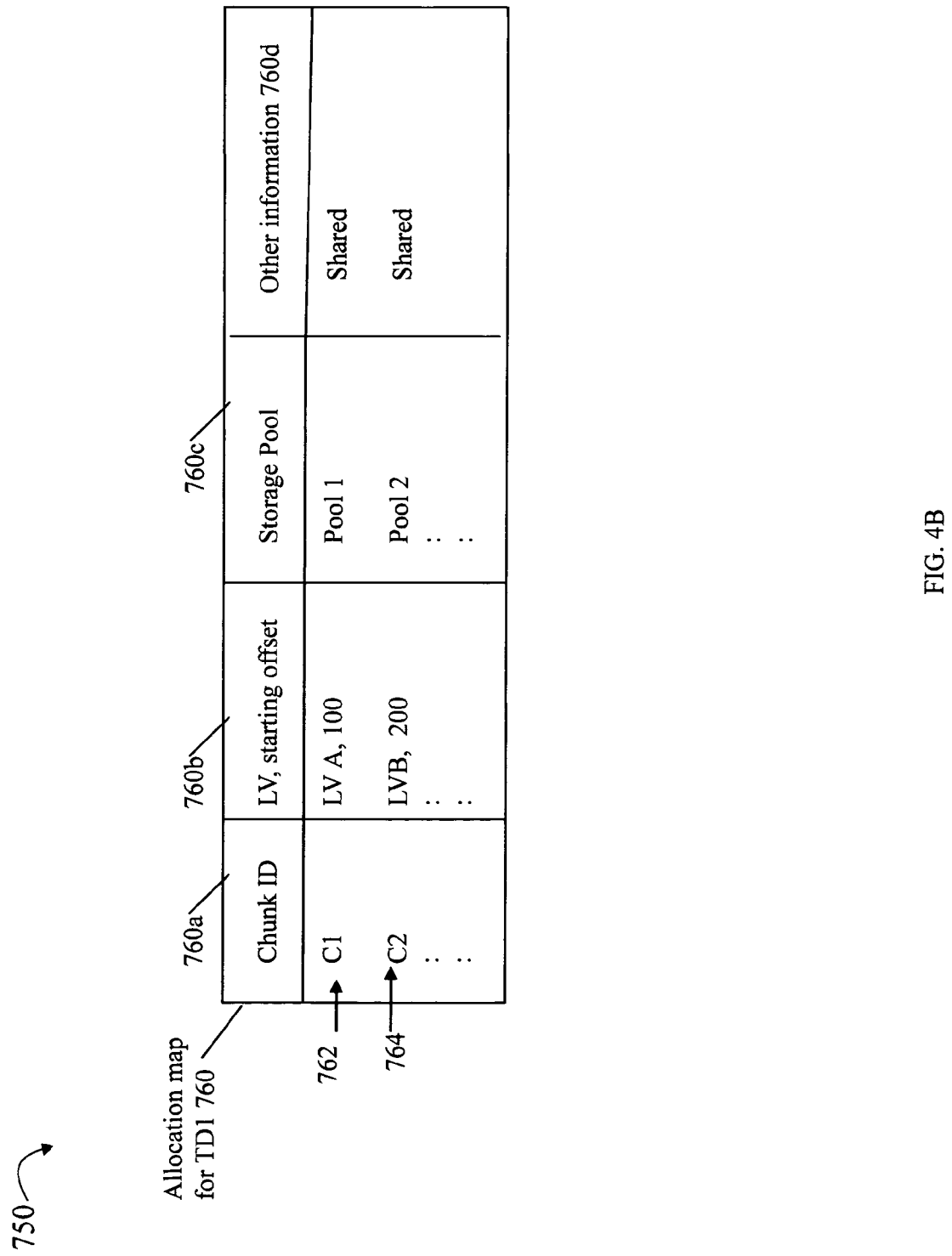
FIG. 4B is an example of representation of information that may be used in determining a physical device location mapped to a thin device.

Referring to FIG. 4B, shown is an example representation 750 of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 4A such as in connection the mapping of 702 to different storage pool devices. The allocation map 760 may contain an entry for each chunk and identify which LV and associated physical storage is mapped to the chunk. For each entry or row of the map 760 corresponding to a chunk, a first column 760*a*, Chunk ID, denotes an identifier to uniquely identify the chunk of the TD, a second column 760*b*, indicates information about the LV and offset to which the chunk is mapped, a third column storage pool 760*c* denotes the storage pool including the LV of 760*b*, and a fourth column 760*d* of other information as may be maintained for each chunk such as whether storage allocated for a chunk is shared. For example, entry 762 represents chunk C1 illustrated in FIG. 4A as 702*a* and entry 764 represents chunk C2 illustrated in FIG. 4A as 702*b*. Column 760*d* indicates that other information about each allocated chunk may also be stored. For example, in accordance with techniques herein, the other information may indicate whether the storage allocated for the chunk is shared by multiple thin devices. It should be noted that although not illustrated, the allocation map may include or otherwise use other tables and structures which identify a further mapping for each LV such as which physical device locations map to which LVs. This further mapping for each LV is described and illustrated elsewhere herein such as, for example, with reference back to FIG. 3B.

Referring to FIG. 4B, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 4A such as in connection the mapping of 702 to different storage pool devices. The allocation map 760 may contain an entry for each chunk and identify which LV and associated physical storage is mapped to the chunk. For each entry or row of the map 760 corresponding to a chunk, a first column 760*a*, Chunk ID, denotes an identifier to uniquely identify the chunk of the TD, a second column 760*b*, indicates information about the LV and offset to which the chunk is mapped, a third column storage pool 760*c* denotes the storage pool including the LV of 760*b*, and a fourth column 760*d* of other information as may be maintained for each chunk such as whether storage allocated for a chunk is shared. For example, entry 762 represents chunk C1 illustrated in FIG. 4A as 702*a* and entry 764 represents chunk C2 illustrated in FIG. 4A as 702*b*. Column 760*d* indicates that other information about each allocated chunk may also be stored. For example, in accordance with techniques herein, the other information may indicate whether the storage allocated for the chunk is shared by multiple thin devices. It should be noted that although not illustrated, the allocation map may include or otherwise use other tables and structures which identify a further mapping for each LV such as which physical device locations map to which LVs. This further mapping for each LV is described and illustrated elsewhere herein such as, for example, with reference back to FIG. 3B.

Such information as illustrated and described in connection with FIG. 4B may be maintained for each thin device in an embodiment in accordance with techniques herein.

What will now be described are some additional exemplary uses of the shared allocations among thin devices. As a first example, consider an application which provides for making one or more target copies of a source device in a snapshot mode. The source device and target devices may be thin devices and, in connection with the snapshot mode, portions of the source and target thin devices may share allocated physical storage.

Figure 5:
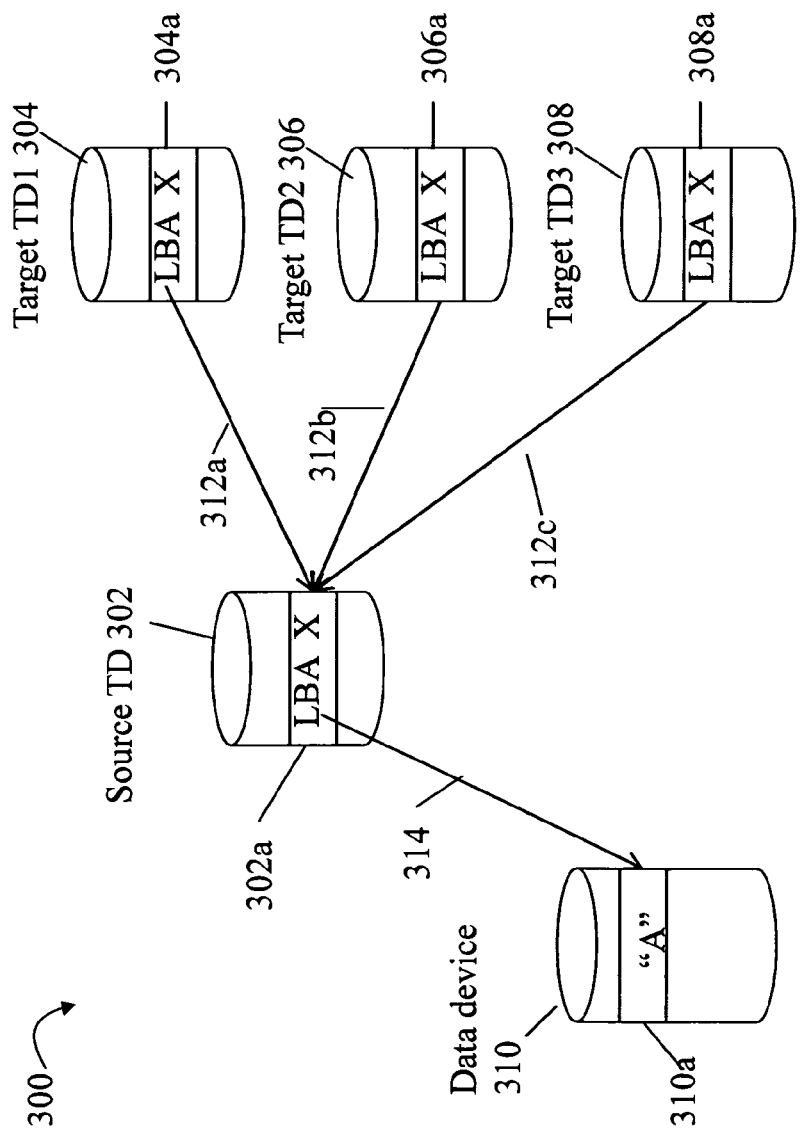
FIGS. 5, 6, 7, 7A, 7B, 7C, 8, 8A, 9, 10A and 10B illustrate various examples as may be performed in an embodiment in connection with the techniques herein.

Referring to FIG. 5, shown is an example 300 illustrating use of the techniques herein when taking 3 snapshots of the source thin device with each snapshot being a target thin device. Each such snapshot may also be characterized as a target thin device that is a copy of the source thin device. The example 300 includes source thin device (TD) 302 and target TDs 304, 306, and 308. At a first point in time, a command is issued to make the foregoing three snapshots. The command may be issued to an application which "clones" or makes 3 copies of the source TD 302 data such as may be performed by the EMC® Symmetrix® Timefinder® family of products. It should be noted that although 3 copies and therefore 3 target TDs are illustrated, an embodiment may provide for making any number of copies up to a maximum that may vary with embodiment. For example, the maximum may be 16, 32 or another number of maximum copies indicating a maximum number of corresponding target TDs. For simplification in illustrating the example, each of the source TD 302 and target TDs 304, 306, and 308 include only a single data portion or chunk located at LBA X that maps to physical storage location 310*a* of data device 310 containing data contents "A". Each of the target TDs 304, 306 and 308 are copies of the source TD 302 and contains the same data stored at the same logical addresses such as the same LBAs.

Elements 312, 312*b* and 312*c* may represent indirection pointers such as used and maintained by the application in connection with TDs that the application knows contain the replicate copies of data. Element 314 may represent an allocation pointer mapping a portion of the source TD, such as a subrange of LBAs, to physical storage associated with the data device 310. If a request is made to read data of the source TD 302 located at LBA X, pointer 314 is used. If a request is made to read data of any of the target TDs 304, 306, or 308 at LBA X, the read request may be serviced using an appropriate one of 312*a*, 312*b* or 312*c* and also 314. For example, if a request is received to read 304*a* (target TD1, LBA X), indirection pointer 312*a* is used to determine a corresponding location 302*a* on the source TD 302. Subsequently a second pointer, allocation pointer 314, is determined which maps 302*a* of the source TD to the physical storage location 310*a* where the data contents "A" is stored.

In connection with the foregoing, the indirection pointers 312*a*, 312*b* and 312*c* may be characterized as application specific or internal pointers used by the particular application performing the cloning operation to obtain requested data. In connection with the read to target TD1 304, the read request may be intercepted by the application which utilizes its indirection pointer 312*a* along with allocation pointer 314 to obtain the requested read data.

Consider the example of FIG. 5 when a write is received to write "B" to source TD 302 at LBA X 302*a*. As a result of performing the write operation to write the data "B" to the source TD at LBA X, data contents referenced by each target TD 304, 306 and 308 should be unaffected. In connection with processing the write operation to the source TD 302 with reference to FIG. 6, a new portion of physical storage 320*a* is allocated from data device 320 and the old data contents of "A" from physical storage location 310*a* is copied to the new physical storage location 320*a*. The indirection pointers 312*a*, 312*b* and 312*c* are removed. Data portions 304*a*, 306*a* and 308*a* of the target TDs 304, 306 and 308, respectively, are updated to have allocation pointers 352*a*, 352*b* and 352*c* map to the new physical location 320*a* containing the data contents "A" prior to performing the write operation. Using allocation pointer 314, the physical location 310*a* is identified and updated to contain the newly written data contents "B" of the write operation thereby overwriting 310*a*'s previous contents "A". It should be noted that the LBA of 310*a* (e.g., on the data device 310 where the data "A" is stored) may be different than that LBA of 302*a* (e.g., on the thin device 302*a* and also thin devices 304, 306 and 308). Furthermore, data devices 310 and 320 may be the same data devices as illustrated or different data devices.

Figure 6:
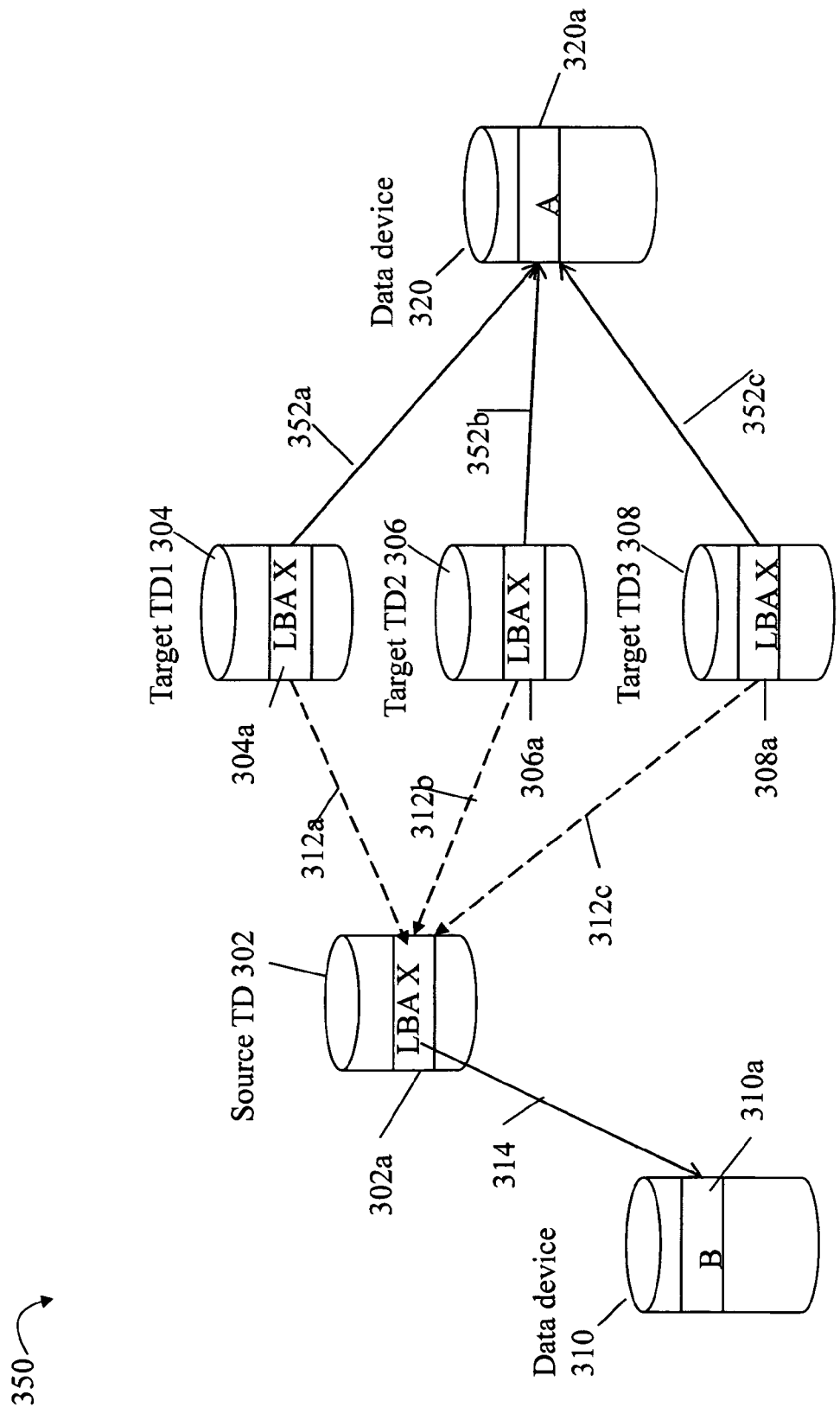
Figure 7:
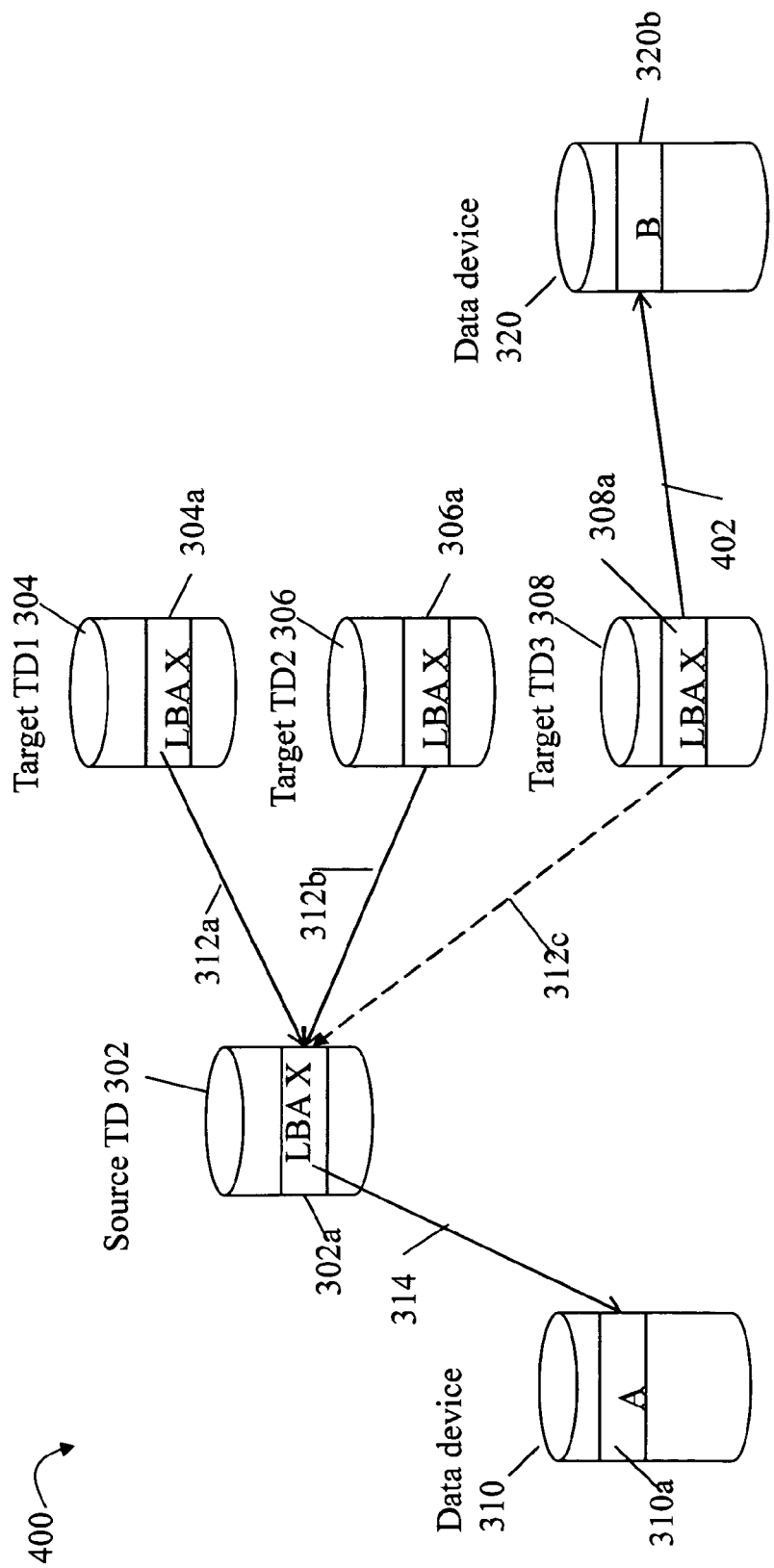

As a variation to the foregoing, rather than receive a write operation directed to 302*a* of the source TD 302 as described in connection with 350 of FIG. 6, consider the example of FIG. 5 when a write is received to write "B" to target TD3 308 at LBA X as represented by 304*a*, As a result of performing the write operation to write the data "B" to 308*a* of the target TD3 308, data contents referenced by each target TD 304, 306 and also the source TD 302 should be unaffected. In connection with processing the write operation to the target TD3 308 now with reference to 400 of FIG. 7, a new portion of physical storage 320*b* is allocated from data device 320, the old data contents of "A" from physical storage location 310*a* may be copied to the new physical storage location 320*b*, and then the data "B" of the write operation may be written to location 320*b*. It should be noted that such copying of the old data contents "A" from 310*a* to 320*b* prior to overwriting 320*b* with the write operation data may be necessary if the size of the data to be written is not the same size as a chunk such as referenced using the allocation and indirection pointers. Otherwise, if the size of the data to be written is the same size as the chunk, then the foregoing copying of the old data contents may be omitted. Processing may also include removing the indirection pointer 312c. Data portion 308a of the target TD 308 is also updated to have allocation pointer 402 map to the new physical location 320b containing the write operation data "B".

Figure 7A:
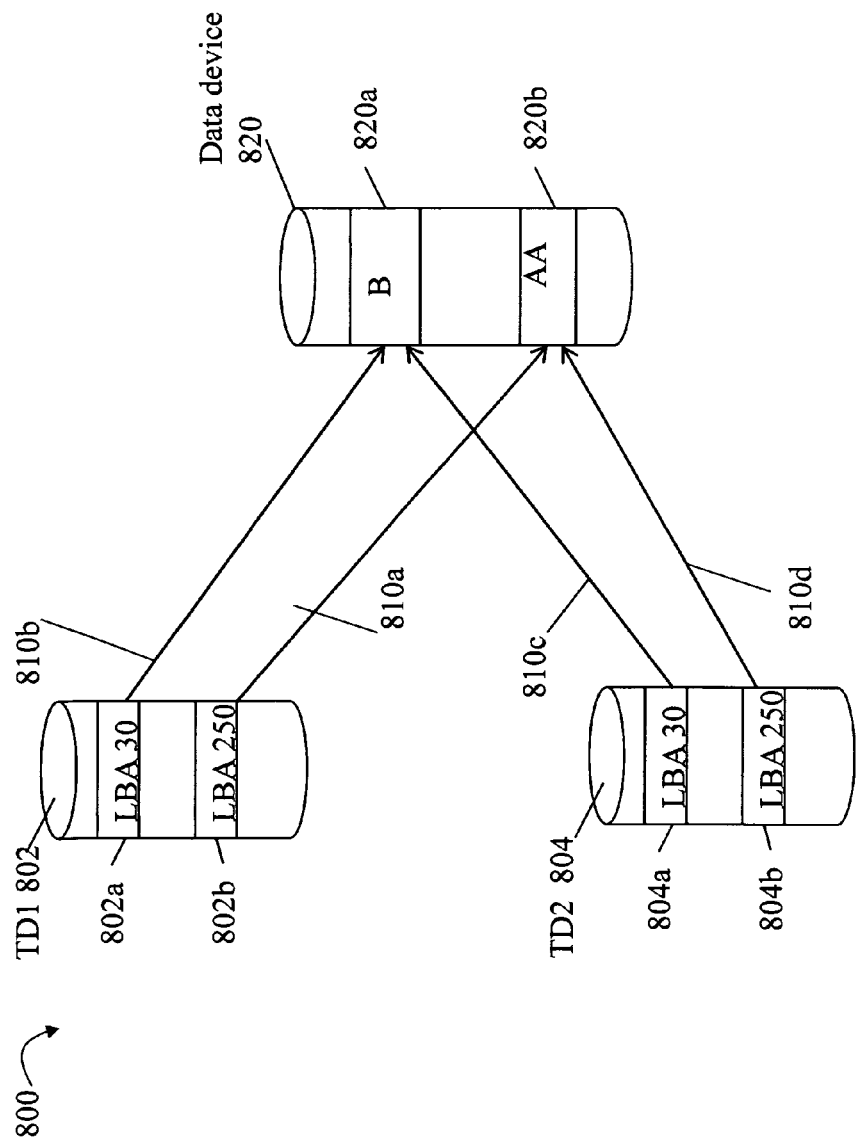

Referring to FIG. 7A, shown is an example illustrating use of the techniques herein in connection with creating a clone or copy of a source device in an embodiment in accordance with techniques herein. The example 800 of FIG. 7A differs from that described above in that no indirection or application pointers are used. In the example 800, TD1 802 may be a source TD having a first data portion 802a located at LBA 30 is stored at physical storage location 820a (as represented by allocation pointer 810b) and a second data portion 802b located at LBA 250 stored at physical storage location 820b (as represented by allocation pointer 810a). A copy or clone of source TD 1 802 may be made on a target TD 2 804 by having each of the data portions 804a, 804b map directly to the existing allocated physical storage location 820a, 820b. In particular, data portion 804a has an LBA subrange of TD2 804 that is the same as the LBA subrange associated with 802a of TD 1 802. Allocation pointer 810b maps 802a to 820a and similarly an allocation pointer 810c is utilized in connection with creating TD2 804 as a copy of TD1 802 where 810c is used to map 804a to 820a. Thus, 804a is mapped to the same physical storage location 820a as 802a. In a similar manner, data portion 804b has an LBA subrange of TD2 804 that is the same as the LBA subrange associated with 802b of TD 1 802. Allocation pointer 810a maps 802b to 820b and an allocation pointer 810d is utilized in connection with creating TD2 804 as a copy of TD1 802 where 810d is used to map 804b to 820d. Thus, 804b is mapped to the same physical storage location 820b as 802b.

When performing an operation to read data from either 802 or 804, the data may be directly accessed from the physical storage location using the allocation pointers rather than possibly having to utilize an additional indirection pointer as described above. When performing a write operation to one of the TDs 802, 804, processing may be performed similar to that as described above when writing to a source TD or target TD. For example, assume a write operation is received to write to 802a of 802. Processing may be performed to allocate additional physical storage for the newly written data, write the write operation data to the additional physical storage allocated, and then remap allocation pointer 810b from 802a to the additional physical storage.

If desired, an embodiment may use the foregoing techniques described in connection with FIG. 7A to provide multiple target TD copies of the source TD 1 802 rather than a single copy on TD2 804. The additional copies of source TD1 802 may be made in a manner similar to that as illustrated in FIG. 7A in connection with TD2 804. Each target TD (that is a copy of the source TD1 802) maps the same corresponding LBA portions as TD1 802 to the same physical storage locations as TD1 802 thereby having each target TD with its allocation pointers mapping to the same physical storage locations as the source TD.

An embodiment may use the foregoing techniques described in connection with FIG. 7A to also make a copy of TD2 804. In connection with this, TD2 804 serves as the source and another third thin device that is a copy of TD3 804 may be made in a manner similar to that in which TD2 804 is created from TD1 802. That is, the allocation pointers of the third thin device may map to the same physical storage locations as TD2 804. In this manner, a further copy may be made of any previous copy or clone of a thin device. For example, to further illustrate, yet a fourth thin device may be made from the third thin device in a manner similar to that in which TD2 804 is created from TD1 802 and in which the third thin device is made from TD2 804.

It should be noted that an embodiment using allocation pointers (e.g., where each copy or clone in the foregoing chain of multiple copies directly points to the actual physical storage location of the data chunks) may provide benefits over other techniques such as other possible implementations using indirect pointers. In particular, other implementations and techniques may include creating a chain of indirections using indirect pointers where each thin device clone or copy has an indirect pointer to another thin device clone or copy, and only the first in the chain has a direct allocation pointer to the actual physical storage location of the data. In such an arrangement using indirect pointers, a thin device clone in the chain may access the actual data indirectly through the chain of indirect pointers adding complexity and overhead. Alternatively, having each thin device clone or copy point to the actual physical storage location directly may provide additional benefits by having each thin device (e.g., all thin device clones as well as the original source thin device) maintain allocation pointers to directly access the physical storage location of the data as described above.

Figure 7B:
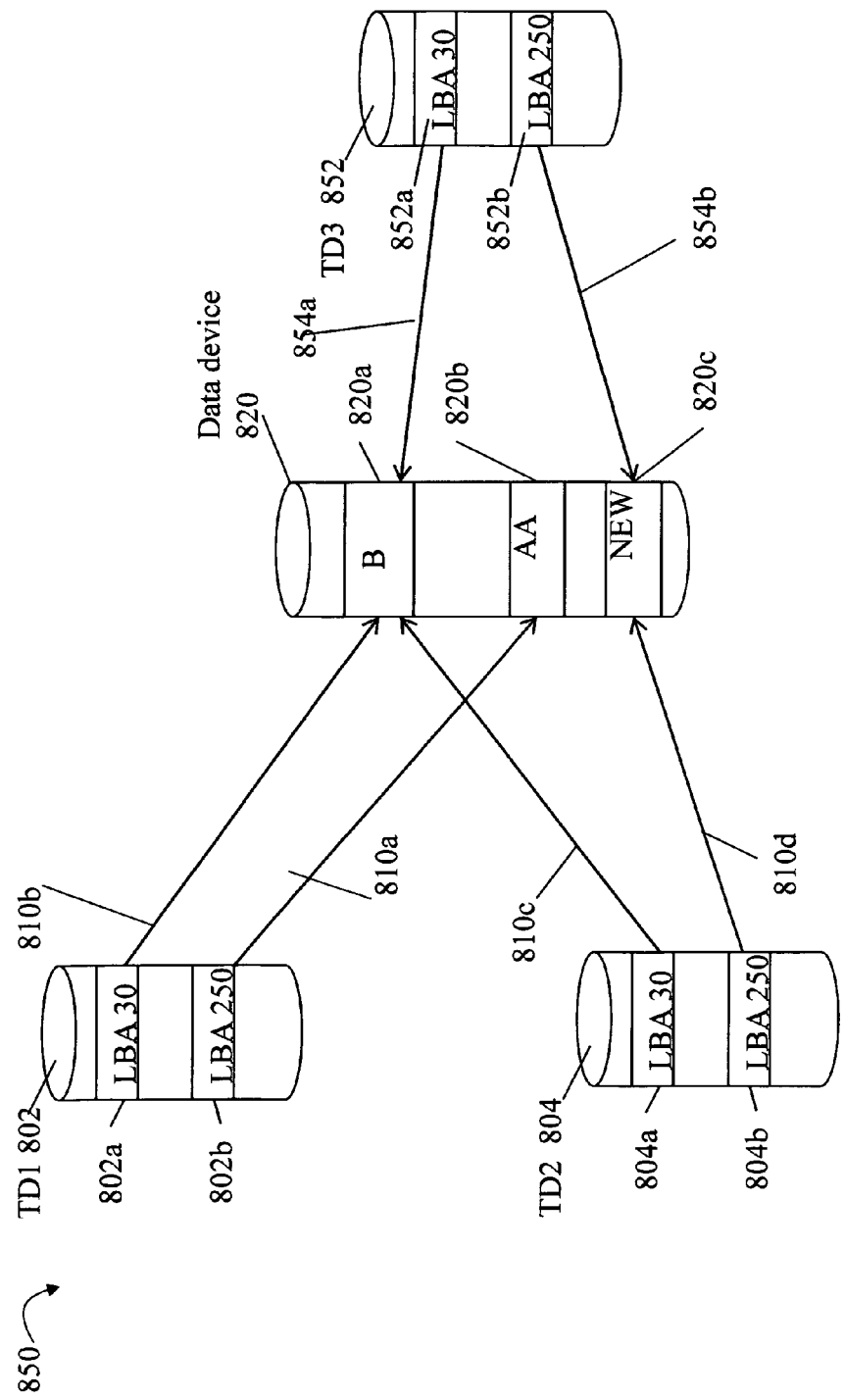

Furthermore, with reference now to FIG. 7B after creating TD2 as a copy of TD1 at a first point in time, consider an example where a write is made to write the data "NEW" to portion 804b and then a request is made at a second subsequent point in time to create a copy of TD2 804 on yet another third TD, TD3. In connection with the write operation to write to LBA 250 (804b) of TD2 804, physical storage 820c is allocated and 810d is remapped to 820c. TD3 may be created as a copy of TD2 at the second point in time as illustrated in 850 of FIG. 7B by having TD3 852 map the same corresponding LBA portions as TD2 804 to the same physical storage locations as TD2 804 thereby having TD3 852 with its allocation pointers mapping to the same physical storage locations as the TD2 804. For example, allocation pointer 854a maps 852a to 820a and allocation pointer 854b maps 852b to 820c.

In connection with the foregoing example, it should be noted that thin device portions containing the same data contents are located on different thin devices and at a same logical address or LBA within each such thin device. However, this is due to the particular use of the techniques in connection with providing copies of the source thin device on target thin devices and allowing such source and target thin devices to share physical storage for thin device portions containing the same data. More generally as illustrated elsewhere herein, two thin devices portions sharing a same physical storage location may be located on different thin devices at the same or different LBAs. Furthermore, the two thin device portions may also be located on the same thin device at different LBA offsets.

Figure 7C:
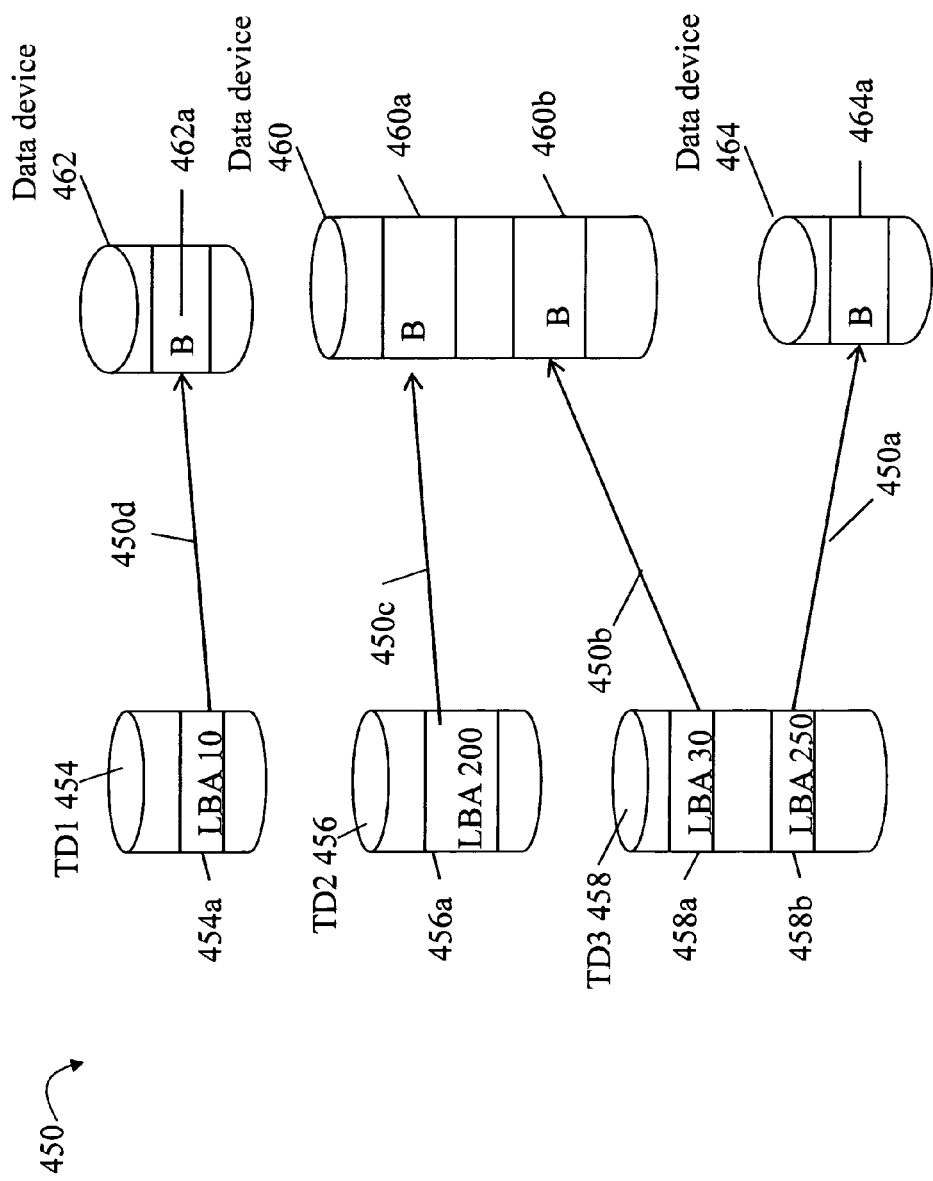
Figure 8:
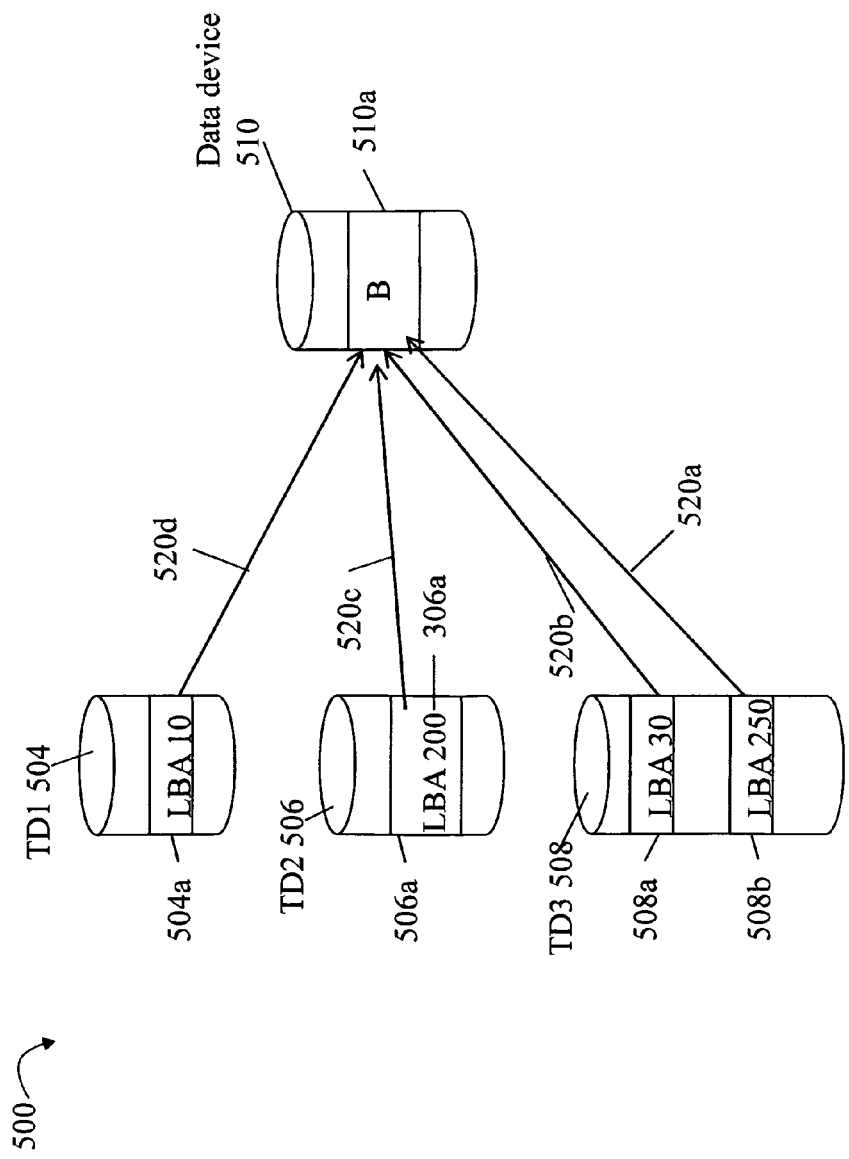

Referring to FIGS. 7C and 8, shown is an example illustrating use of techniques herein with thin devices having common data contents stored at different locations in the same and also different thin devices and also illustrating use of the techniques herein in connection with performing data deduplication processing.

Referring to FIG. 7C, the example 450 includes TDs 454, 456, and 458. Each thin device portion 504a, 506a, 508 and 508b is located at a different logical address or offset in the thin device. Furthermore, thin device portions 508a, 508b are located on the same thin device. A data storage system prior to using techniques herein may not allow sharing of provisioned physical storage among thin devices so that separate physical storage locations 462a, 460a, 460b, 464a are allocated, respectively for each of 504a, 506a, 508 and 508b. Each of the physical locations 462a, 460a, 460b, 464a contains a duplicate copy of the data "B". Element 450d represents the mapping via allocation pointer from 454a to 462a. Element 450c represents the mapping via allocation pointer from 456a to 460a. Element 450b represents the mapping via allocation pointer from 458a to 460b. Element 450a represents the mapping via allocation pointer from 458b to 464a.

At a later point in time in accordance with techniques herein, processing may be performed on the data storage system to detect what thin device portions contain the same data contents and share a single physical storage location among all such thin device portions such as illustrated in connection with FIG. 7C. For example, in the example 450, duplicate contents of physical location 462a, 460a, 460b and 464a may be detected. An embodiment may detect such redundant data by scanning and comparing the data contents of thin devices. Such processing may be performed as a background task for one or more selected thin devices, or particular portions of such thin devices (e.g., one or more subranges of the logical address range for the thin devices). A user or application may have knowledge regarding what thin devices and/or portions of the same or different thin devices are likely to contain duplicate data. Such knowledge may be used to limit the scanning performed to locate duplicate data contents of one or more thin devices. For example, hint information may be communicated from an application, user, and the like, to code that performs the scanning to determine duplicate thin device data contents. The hint information may indicate candidate thin devices and/or candidate thin device portions which may be likely to contain duplicate data contents based on the particular data stored. The hint information may also be more specific and may identify known thin device portions, on the same or different thin devices, which actually contain redundant data contents. For example, in connection with an application which makes clones or copies of a source thin device as described above in connection with FIGS. 5, 6, 7 and 7, the application has knowledge regarding the source thin device and target thin devices. In particular, the application knows that immediately after the request is made to make the copies on the target thin devices and prior to performing any subsequent write operations to the source or target thin devices, each such thin device contains the same data contents.

As another example of when hint information may be provided and used in connection with determining duplicate thin device portions, consider data as may be utilized in connection with virtual machines (VMs) executing in a virtualized environment. For example, an embodiment may have one or more virtual machines executing on a single physical machine in a virtualized environment using virtualization software produced by VMware, Inc. In the context of each virtual machine, one or more applications may be executed, where the applications may include any one or more of, for example, an email application such as Microsoft Exchange, a web server, or a database application. Each VM may utilize its own set of data that is located on a same thin device or a different thin device than data used by other VMs. A VM manager component that manages the multiple VMs may have knowledge regarding what thin devices, and/or portions thereof, are used by each VM for what purpose. As such, the VM manager may provide hint information regarding what thin devices, and/or portions thereof, may contain duplicate data portions. For example, the VM manager may know that particular thin device portions are used by two different VMs—VM1 and VM2. VM1 may execute an email application and a database application and VM2 may execute the same email application as VM1. Thus, VM1 and VM2 may have duplicate thin device data portions in connection with those thin device portions used by VM1 and VM2 for the same email application. As such, the VM manager may provide hint information indicating what thin device portions are used by VM1 and VM2 with the same email application to thereby limit the scanning performed for detecting duplicate data contents. Additional exemplary uses regarding VMs are described elsewhere herein.

It should be noted that an embodiment may determine a hash value, or more generally, a token value for a portion of data stored on a thin device. The token value for a data portion provides for uniquely identifying and distinguishing said data portion from other data portions. Additionally, data portions having the same token value may be used to identify duplicate data contents stored in two thin device portions. As such, once such token values are determined for thin device portions, the token values may be used rather than the actual stored data contents. Use of such token values may provide for increased processing in connection with determining redundant thin device portions. The token values may be determined, for example, as part of processing performed by a background task, when data is written, and the like. A token value may be determined for a data partition that is the same size as a chunk as well as smaller than a chunk and may vary with embodiment.

With reference back to FIG. 7C, once the duplicate data contents stored physically on multiple different physical locations 462a, 460a, 460b and 464a have been detected, processing may be performed to remap each of the allocation pointers 450a-450d to a single physical storage location thereby making available the physical storage space associated with the eliminated three redundant copies.

With reference now to FIG. 8, shown is an example 500 as a result of performing data deduplication processing in accordance with techniques herein. As described above, deduplication processing may include processing to detect duplicate data contents stored at multiple physical storage locations and replace the duplicate copies with a single physical copy. Each of the thin device portions 504a, 506a, 508a and 508b may then be mapped to a single physical storage location 510a containing the previously redundantly stored data contents "B". It should be noted that each thin device portion 504a, 506a, 508 and 508b is located at a different logical address or offset in the thin device. Furthermore, thin device portions 508a, 508b are located on the same thin device. As noted above, a token such as a hash value may be used to identify the data contents stored in a data portion of a thin device and data deduplication processing may use such tokens once determined for a thin device portion. An embodiment may retain physical storage for a single one of the duplicate copies and then map all other thin device portions to this single physical storage location containing the data.

Figure 8A:
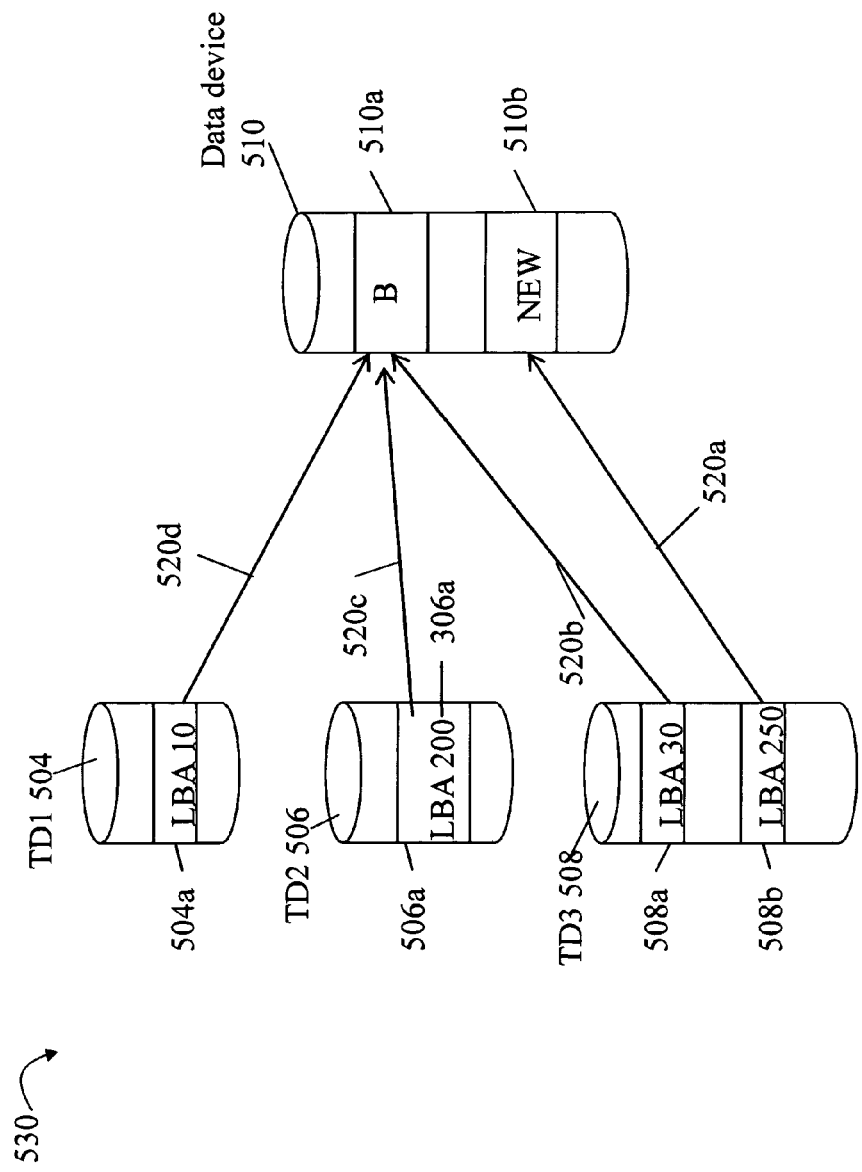

With reference to FIG. 8, a write operation may then be performed to one of the TDs 504, 506 or 508 in a manner similar to as described above in connection with writing to a source or target TD. For example, consider performing a write operation that writes the data "NEW" to LBA 250 (508b) of TD3. With reference now to 530 of FIG. 8A, the write may result in allocating an additional physical storage location 510b on data device 510 (or another data device), remapping 520a to point to the new additional physical storage location 510b, and writing the data "NEW" of the write operation to the new additional physical storage location 510b. Thus, as writes are performed to one or more portions of the TDs accessing the shared physical storage location, additional physical storage may be allocated as needed, and such TDs may have their allocation pointers updated to map to the additional physical storage allocated.

Figure 9:
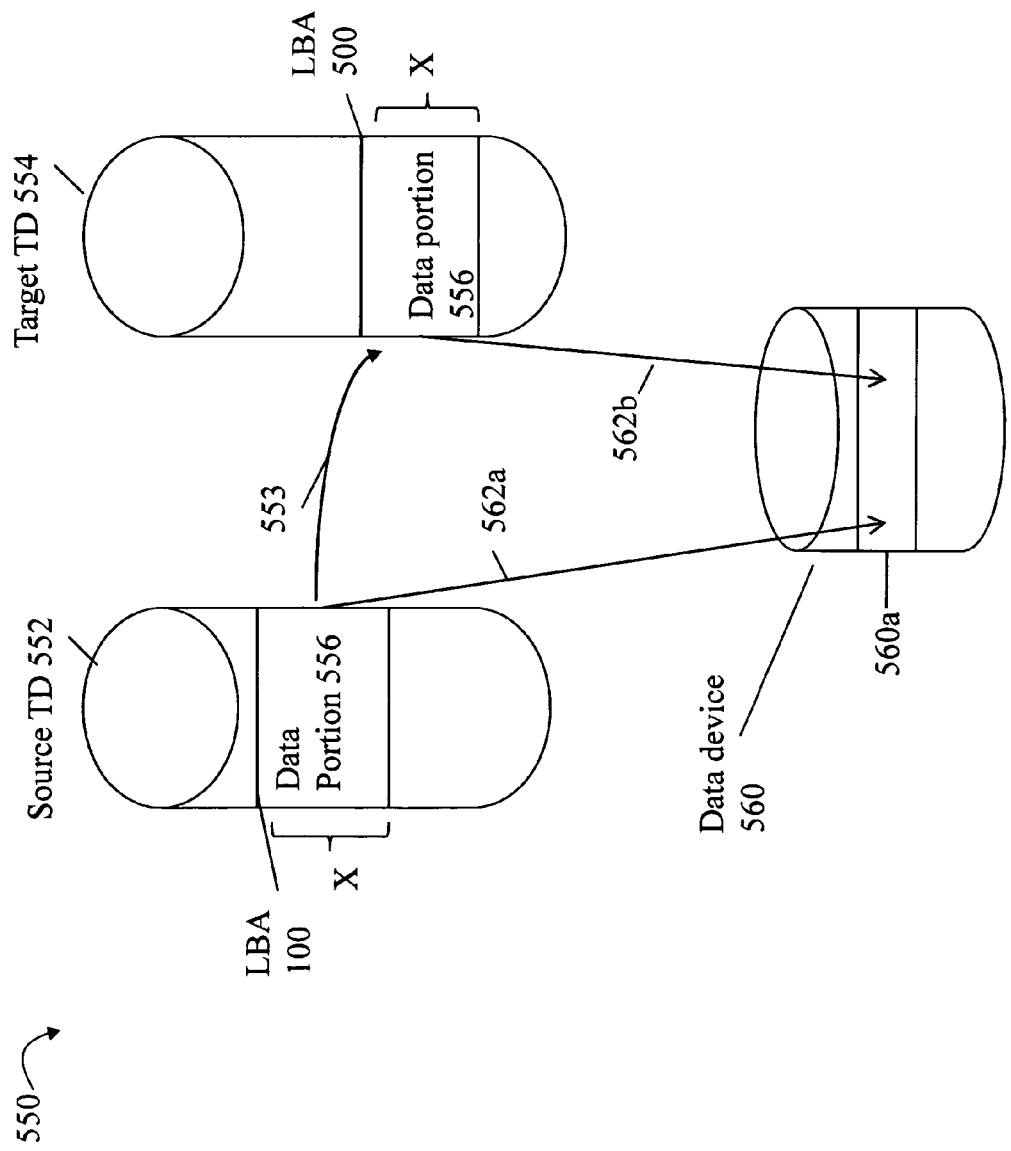

Referring to FIG. 9, shown is an example illustrating use of the techniques herein in an embodiment in connection with data migration or relocation. The example 550 includes a source TD 552 and a target TD 554 where a data portion 556 is relocated from the source TD 552 to the target TD 554. At a first point in time, the source TD 552 may store data portion 556 at a physical location 560a on data device 560. The foregoing mapping of data portion 556 (located at starting offset LBA 100 of the source TD 552 and spanning a subrange X of the source TD 552's entire LBA range) to physical location 560a of data device 560 is represented using allocation pointer 562a. At a second subsequent point in time, processing may be performed to relocate or migrate data portion 556 having a starting LBA 100 of the source TD 552 to another starting LBA on another TD which, in this example is the LBA 500 of the target TD 554 as illustrated by 553. As described elsewhere in connection with other TDs and exemplary illustrations of the techniques herein, the data portion 556 may be stored on the source TD 552 at a first LBA and stored on the target TD 554 at a second LBA that is the same or different from the first LBA. Relocating or migrating data portion 556 from source TD 552 to target TD 554 may include mapping a subrange of the target TD 554's LBA range starting at LBA 500 to the physical storage location 506a of the data device 560 as represented by allocation pointer 562b. The foregoing subrange of the target TD may be the same size, "X" as associated with storing the data portion 556 on the source TD. Thus, the foregoing relocation of data portion 556 from source TD 552 to target TD 554 may be performed by mapping a subrange of the target TD 554's LBA range to the previously stored data at the physical location 560a as opposed to actually copying the data contents of 560a to another physical storage location. After the mapping illustrated by 562b has been completed, the data may be considered migrated or relocated. Processing may be performed to deallocate and subsequently reuse that portion of the source TD 552 beginning at LBA 100 which served as the source of the data migration. This deallocation may include unmapping or disassociating the source TD 552 with 560a thereby removing the mapping represented by allocation pointer 562a.

Figure 10A:
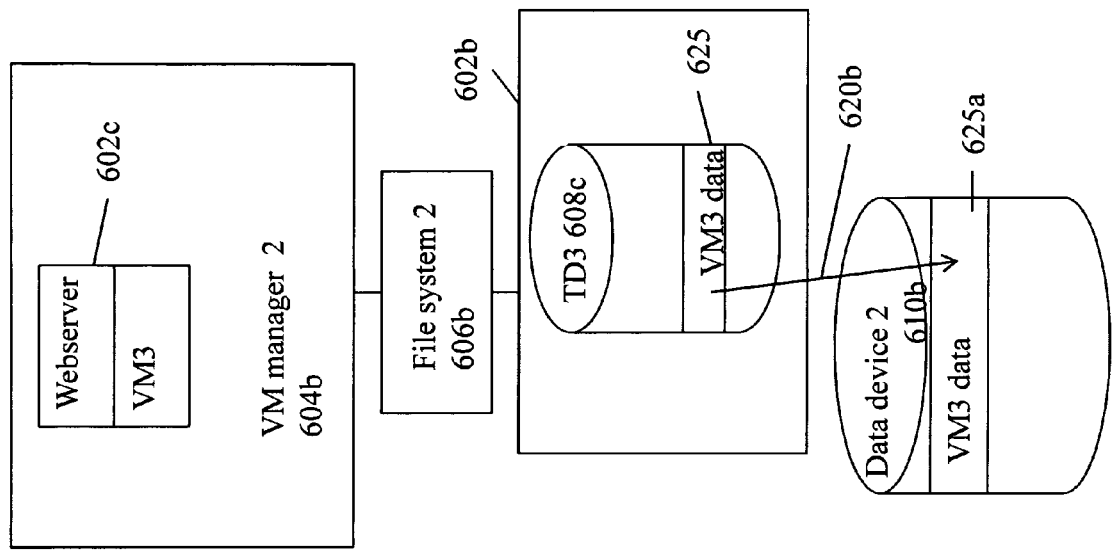
Figure 10A:
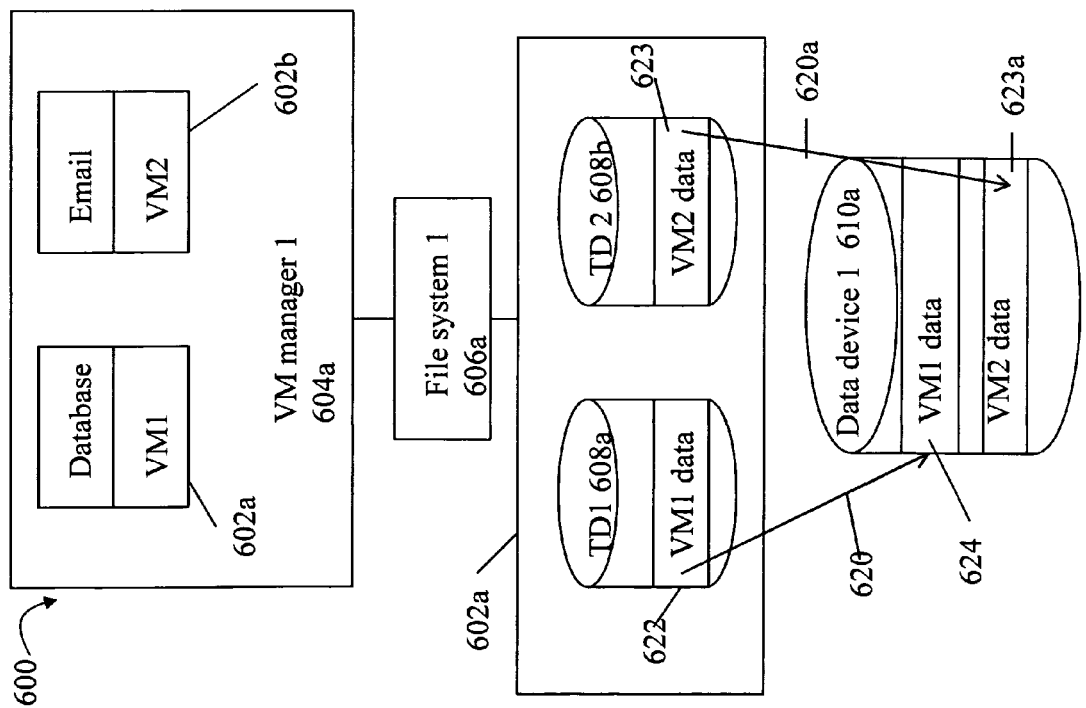
Figure 10B:
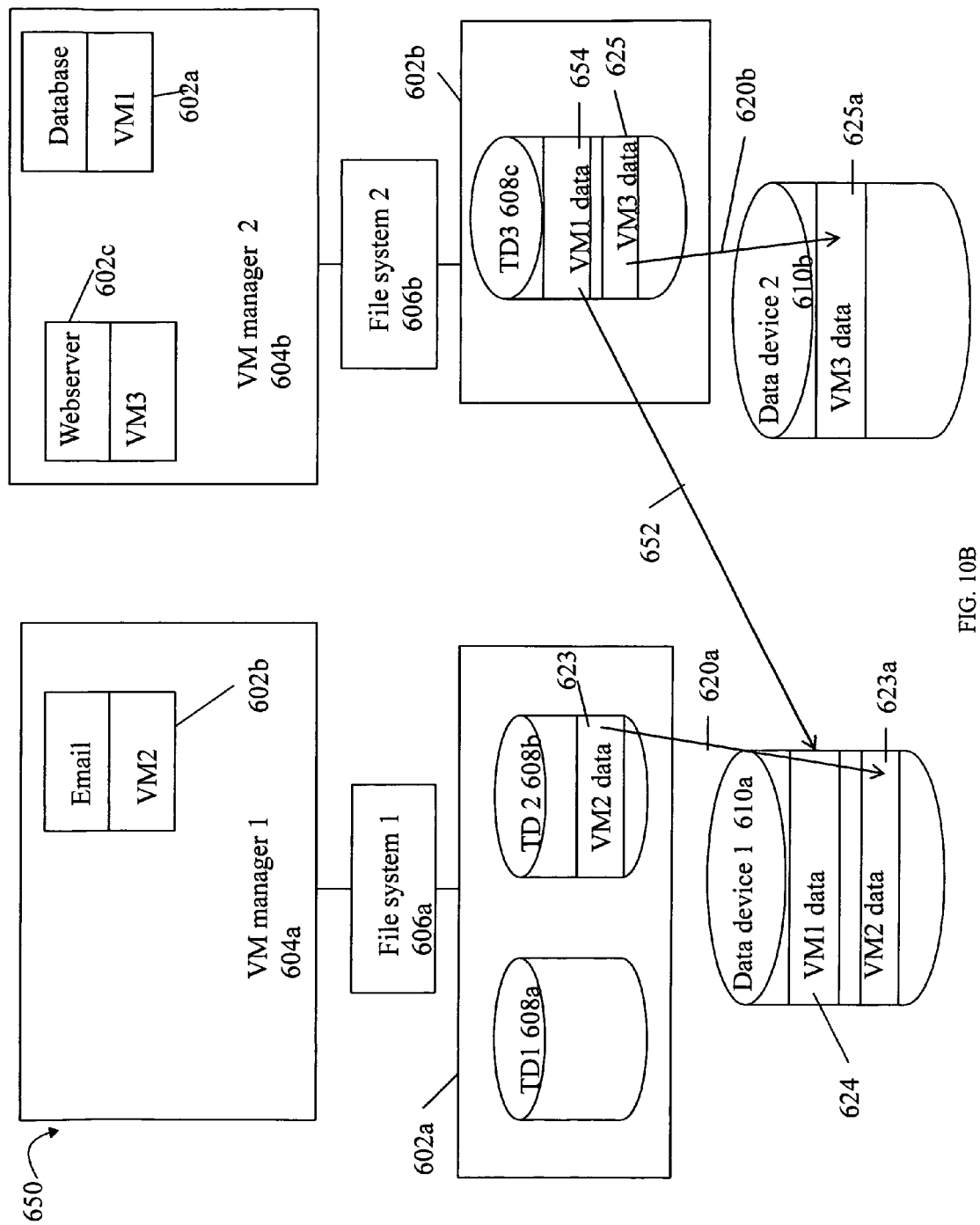

Referring to FIGS. 10A and 10B, what will now be described is an example of the techniques herein in connection with relocating a VM and its associated data.

Referring to FIG. 1OA, the example 600 includes VM 1 602a and VM2 602b managed by VM manager 1 604a and VM3 602c managed by VM manager 2 604b. Each of 604a, 604b may be a hypervisor that performs VM management in connection with multiple VMs such as VMware ESX Server. Such a hypervisor may be installed and run directly on server hardware without requiring an underlying operating system. Each of the VM managers 604a, 604b may perform management of the underlying server's physical resources for use among the multiple VMs that can run simultaneously. In this example, a database application is executed by VM1 602a, an email application is executed by VM2 602b and a webserver is executed by VM3 602c.

Each VM manager 604a, 604b may mount and use one or more file systems. In this example, VM manager 1 604a has mounted and uses file system 1 606a and VM manager 2 604b has mounted and uses file system 2 606b. Each of 606a, 606b may be a file system designed for use with VMs such as the VMware Virtual Machine File System (VMFS) by VMware, Inc. VMFS is a high performance cluster file system that provides multiple virtual machines with shared access to a consolidated pool of clustered storage. Files stored in a VMFS may contain VM data (e.g., such as for a named or numbered drive C: of a VM running a Windows-based operating system, data used by a database or other application running in the context of the VM, and the like). Data used by a VM may include data used by the particular application executing on the VM (e.g., database data and log files for a database application executing on a VM such as VM 1 602a) as well as VM metadata regarding its state, configuration, and execution context such as, for example, data stored in memory, CPU registers, swap files, log files, and the like.

In the example 600, file system 1 606a uses storage 602a and file system 2 606b uses storage 602b. In particular, file system 1 6060a uses TD 608a to store data 622 for VM1 602a and uses TD 608b to store data 623 for VM2 602b, and file system 2 606b uses TD 608c to store data 625 for VM3 602c. Element 622 represents that portion of the virtually provisioned storage capacity of TD1 which is provisioned for VM1's (602a) data that is physically stored at physical storage location 624 (as represented by allocation pointer 620). Element 623 represents that portion of the virtually provisioned storage capacity of TD2 which is provisioned for VM2's (604b) data that is physically stored at physical storage location 623a (as represented by allocation pointer 620a). Element 625 represents that portion of the virtually provisioned storage capacity of TD3 which is provisioned for VM3's (602c) data that is physically stored at physical storage location 625a (as represented by allocation pointer 620b).

For any one of a variety of different reasons, such as due to load balancing for VM performance as related to usage of the data storage system resources, a VM may be relocated. For example, VM1 602a managed by VM manager 1 604a may be relocated to another VM manager 2 604b. As part of the foregoing VM1 602a relocation or migration, VM1 data 622 may be relocated to TD3 608c. Each of the VMs 602a-602c may be executing on one or more data storage systems. In one embodiment, VMs managed by 604a, file system 1 606a and data device 610a may be on a first data storage system and VMs managed by 604b, file system 2 606b and data device 610b may be on another data storage system. The foregoing first and second data storage systems may be, for example, data storage arrays which are remotely located from one another. In another embodiment, all the components illustrated in FIG. 10A may be included in the same data storage system.

In connection with techniques herein, movement of data, such as VM1 data 622, may be performed without actually copying the data between physical storage locations. Rather, in accordance with techniques herein, such data movement may be performed by creating and assigning a new allocation pointer mapping a currently unused portion of T3 608c's LBA range to physical storage location 624. This is illustrated with reference now to FIG. 10B. The example 650 of FIG. 10B illustrates changes with respect to FIG. 10A after such data movement or migration of VM1's data is performed. In the example 650, a portion 654 of TD3's LBA range is mapped, via allocation pointer 652, to the physical storage location 624 containing VM1 data. Additionally, it should be noted that such processing may also include deallocating previously used storage capacity of TD 1 608a. With reference to FIG. 10A, such deallocation may include disassociating 622 with 624 such as by removing the allocation pointer 620.

It should be noted that the foregoing VM data migration or movement may be performed using facilities available for the particular VM framework and architecture used in an embodiment. For example, an embodiment using VMs and VM framework and architecture by VMware, Inc., may use Storage vMotion to migrate VM data. VM data transfers may be triggered under the instructions issued by a VM manager. In one embodiment utilizing SCSI commands, the Storage vMotion may issue commands, such as XCOPY (or extent copy) command, to copy the relevant data from the source to the target TD. As described above, rather than copy the actual data between physical storage locations for VM data movement, an embodiment in accordance with techniques herein may simply map appropriate target TD locations to an already existing physical storage location containing the VM data being migrated As noted above, the techniques herein may be used to migrate VM data from a first file system used by a first VM manager to a second file system used by a second VM manager. The foregoing first and second file systems may be the same as well as different file systems. The VM may be migrated between VM managers executing in the same data storage system. As a variation to the foregoing, the VM may be migrated from a first data storage system (upon which the VM is currently executing) to a second different data storage system (where the VM will execute as a result of the relocation). In this case, the VM data may be initially stored on a source TD mapped to physical storage of a data device of the first storage system. After the VM relocation is completed, the VM may execute on a processor of the second data storage system using its VM data which is physically located on the data device of the first storage system. It should be noted that when a VM executes on a processor, the VM image is loaded and executed. The VM image may be a file including a program that is loaded and executed and may include additional information used in connection with executing the program (e.g. such as state information and the like described elsewhere herein). A VM image may be obtained for an operating VM and transferred to another location where another VM may use the VM image to continue execution of the program from the state defined by the VM image. In this way, the VM image may be a snapshot of an execution state of a program by a VM that may be moved between different locations and processing thereafter continued without interruption. As described herein, VM data may also include other data such as used by the particular application executing in the context of the VM. As part of VM migration, the portion of the VM data that is used by the application may be also migrated with the VM so that the executing VM and the portion of the VM data used by the application executing in the context of the VM are co-located in the same storage system. As a variation, the portion of the VM data that is used by the application may not be migrated with the VM so that the executing VM and the portion of the VM data used by the application executing in the context of the VM are rather each located in different data storage systems.

As a variation to the foregoing, the techniques described in connection with FIGS. 10A and 10B may be used in connection with creating multiple instances of the same VM where each such VM instance may use the same physical copy of the VM data even though each VM instance may have its VM data stored at different TD locations (e.g., LBAs where such TD LBAs are mapped via allocation pointers to the same physical copy). As each VM instance continues executing which may result in updating portions of the VM data, those updated portions of VM data may result in one or more write operations to the VM data and additional storage may be allocated as needed to store the modified VM data portions. The TDs, and portions of the TD address range, used by each VM may be mapped to the appropriate physical data storage locations as portions of the VM data used by each VM may be modified. This is illustrated and described elsewhere herein, for example, in connection with FIGS. 8A and 8B.

Figure 11:
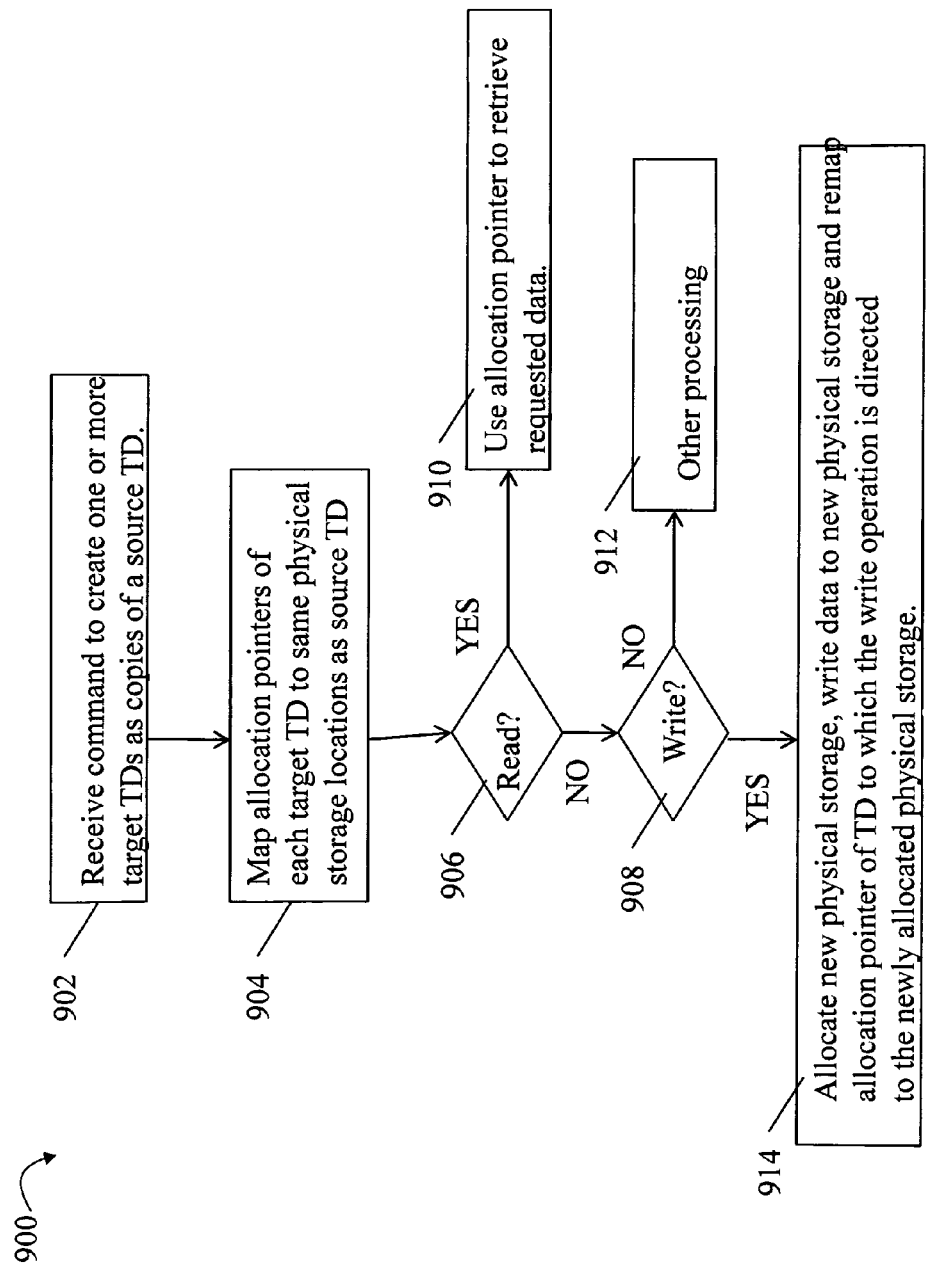
FIGS. 11, 12, and 13 are flowcharts of processing steps that may be performed in an embodiment in connection with techniques herein.
Figure 12:
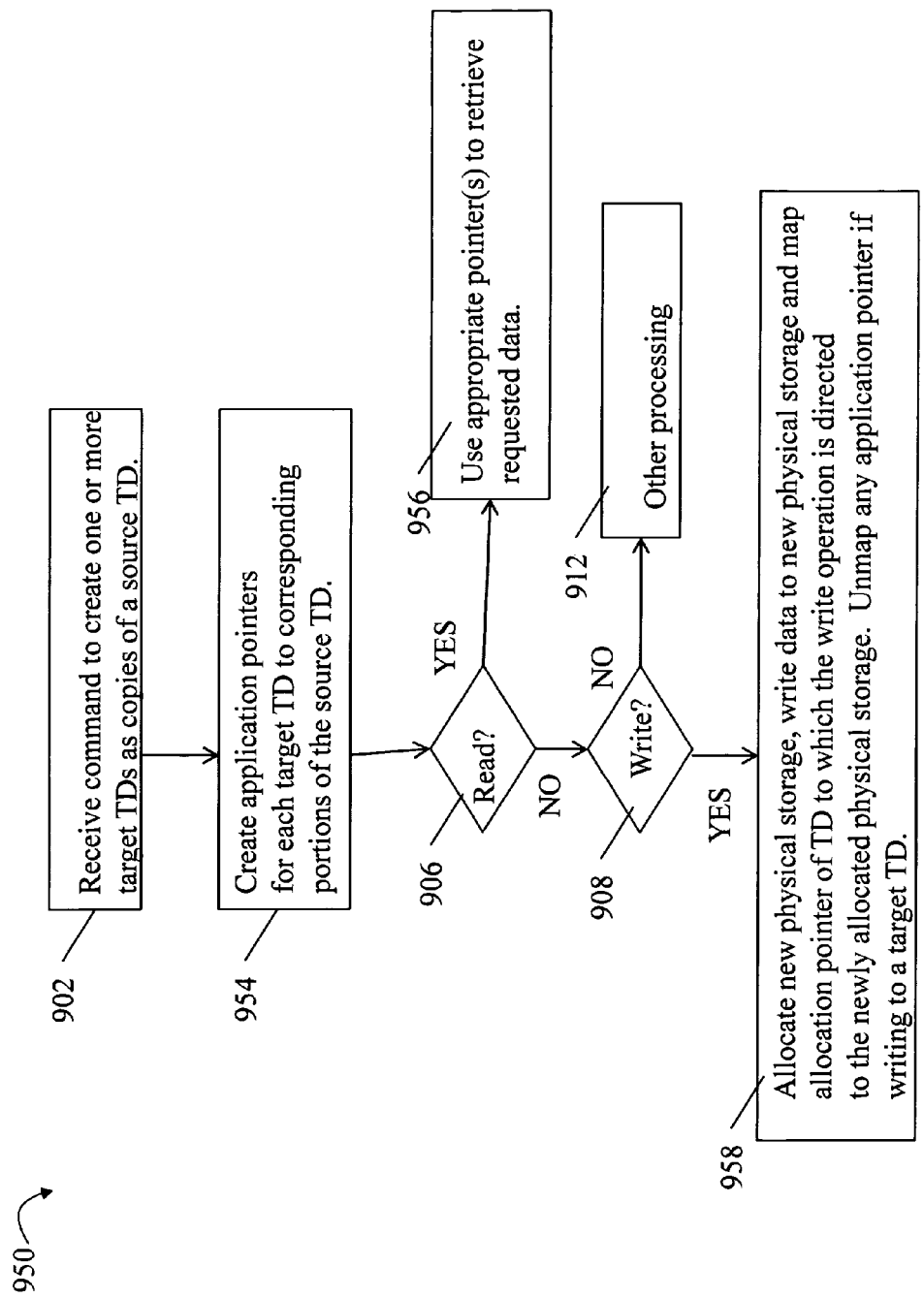
Figure 13:
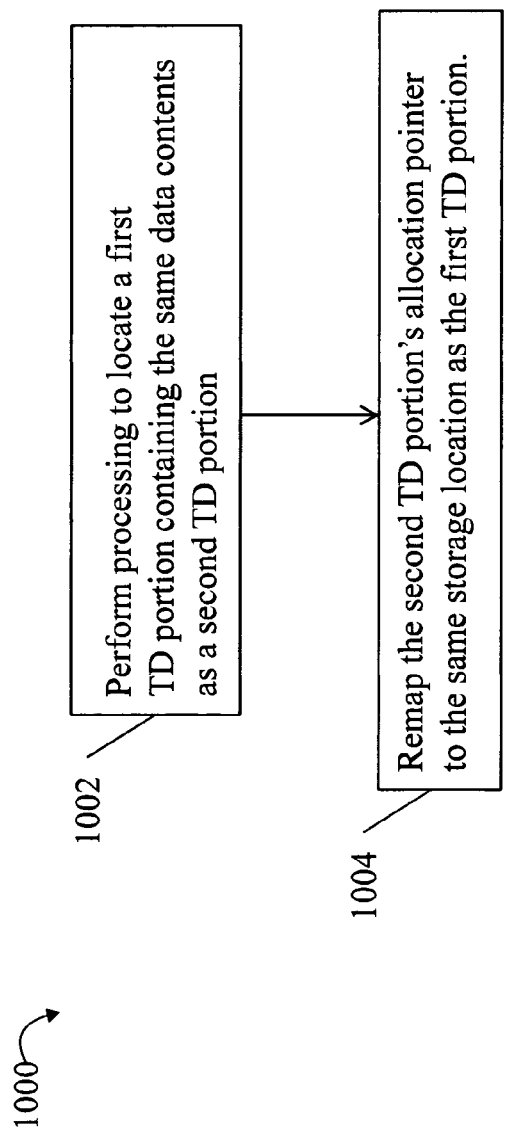

Referring to FIGS. 11, 12 and 13, shown are flowcharts summarizing processing steps that may be performed in an embodiment in accordance with techniques herein. FIGS. 11, 12 and 13 summarize processing described above.

Referring to FIG. 11, shown is a flowchart 900 of processing steps that may be performed in connection with processing for a source TD and one or more target TDs. FIG. 11 describes processing where no application pointers are used such as in connection with FIG. 7A. At step 902, a command may be received to create a copy of the source TD on one or more target TDs, each of which is a copy of a source TD. At step 904, allocation pointers for each target TD are mapped to the same physical storage locations as the source TD. Some time later, an I/O operation directed to any of the source TD and target TDs is received. At step 906, it is determined whether the I/O operation is a read. If so, processing proceeds to step 910 to use the appropriate allocation pointer associated with the TD portion to which the read operation is directed to retrieve the requested data. If step 906 evaluates to no, control proceeds to step 908 where a determination is made as to whether the I/O operation is a write. If not, control proceeds to step 912 to perform other processing. If step 908 evaluates to yes, control proceeds to step 914 to allocate new physical storage, write the data of the write operation to the newly allocated physical storage and remap the allocation pointer of the TD portion to which the write operation is directed to the newly allocated physical storage.

Referring to FIG. 12, shown is a flowchart 950 of processing steps that may be performed in connection with processing for a source TD and one or more target TDs. FIG. 12 describes processing where application pointers are used such as in connection with FIGS. 5-7. Steps of 950 are similar to that as described in flowchart 900 with the difference that FIG. 12 includes steps 954, 956, and 958 rather than, respectively, steps 904, 910 and 914 as in FIG. 11.

At step 902, a command may be received to create a copy of the source TD on one or more target TDs, each of which is a copy of a source TD. At step 954, the application pointers are created for each target TD where each such application pointer maps a target TD portion to a corresponding source TD portion. Some time later, an I/O operation directed to any of the source TD and target TDs is received. At step 906, it is determined whether the I/O operation is a read. If so, processing proceeds to step 956. At step 956, when the I/O operation is a read operation, one or more appropriate pointers may be used to retrieve the requested data. If the read is to the source TD, the appropriate allocation pointer may be used to obtain the requested data. If the read is directed to one of the target TDs that contains a copy of the source TD at the time the read request is received, the requested data may be obtained indirectly using application pointers or indirection pointers. As described herein, an appropriate application pointer may be used that maps a target TD portion to a corresponding source TD portion. The allocation pointer from the source TD portion may then be used to obtain the requested data from physical storage. If step 906 evaluates to no, control proceeds to step 908 where a determination is made as to whether the I/O operation is a write. If not, control proceeds to step 912 to perform other processing. If step 908 evaluates to yes, control proceeds to step 958. At step 958, when the I/O operation is a write operation, processing may be performed as in step 914 of FIG. 11 to allocate new physical storage, write data of the write operation to the new physical storage and map the allocation pointer of the TD portion to which the write operation is directed to the newly allocated storage. Additionally, if the write operation is directed to a target TD portion having an application pointer, the application pointer may be unmapped. It should be noted that once a target TD portion is written to an the application pointer is unmapped, subsequent reads to the target TD portion now use the allocation pointer associating the target TD portion with the newly allocated storage location to read the requested data.

Referring to FIG. 13, shown is a flowchart 1000 of processing steps that may be performed in an embodiment in connection with techniques herein for data deduplication processing. The flowchart 1000 summarizes processing such as described above in connection with FIGS. 7C and 8. In step 1002, processing is performed to locate a first TD portion containing the same data contents as a second TD portion. Step 1002 may include using hint information indicating such duplicate data portions or likely to contain duplicate data portions. If no token values exist for the TD portions or an embodiment does not otherwise use token values representing the contents of each TD portion, step 1002 may include comparing corresponding bits of the actual data for each of the two TD portions to determine whether the two TD portions contain the same data contents. If an embodiment uses token values for the TD portions and such token values exist, step 1002 may include comparing token values of TD portions to determine whether two TD portions include the same data contents (e.g. if the token values of two TD portions match, then the data contents of the two TD portions are the same). As described herein, a token value for a TD portion may be determined at any one or more different times such as, for example, when data is written to the TD portion, as part of background processing, and/or as part of step 1002 processing if an embodiment uses token values and no token value has yet been determined for a TD portion examined in connection with step 1002 processing. At step 1004, once two TD portions containing the same data contents have been identified, the second TD portion's allocation pointer may be updated to point to the same physical storage location as the first TD portion.

In connection with embodiments in which thin devices share physical storage as described herein, benefits include physical storage savings by having only a single physical copy rather than multiple physical copies of the same data. Additionally, caching advantages may be realized in that if any one of the multiple thin devices that maps to the single physical copy of the data performs an operation that results in bringing the copy of the data into cache, the cached data may be used for all references to other thin device portions mapping to the single physical copy.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing data storage management comprising:

storing a first data portion at a first logical address of a first logical address space of a first device, wherein said first logical address is mapped to a first physical storage location at which the first data portion is stored, wherein said first device is a thin device having a first storage capacity and wherein storage is unallocated for at least a first portion of said first storage capacity at a point in time, said first portion corresponding to a range of addresses of said first logical address space not mapped to physical storage; and storing a second data portion at a second logical address of a second logical address space of a second device, wherein said second logical address is mapped to a second physical storage location at which the second data portion is stored, and wherein said first data portion is a duplicate of data contents of said second data portion and said first physical storage location is a same physical storage location as said second physical storage location, wherein said second device is a thin device different from the first device having a second storage capacity and wherein storage is unallocated for at least a second portion of said second storage capacity at a point in time, said second portion corresponding to a range of addresses of said second logical address space not mapped to physical storage, and wherein said first device is a source thin device and said second device is a target thin device that is a snapshot of the source thin device created at a first point in time in response to a command to create the snapshot, and wherein said second logical address of the second device is mapped to said first logical address of the first device by a first pointer and wherein said first logical address is mapped to a third logical address of a third logical device by a second pointer whereby said third logical address is mapped to said same physical storage location storing the data contents of the first data portion and the second data portion.

2. The method of claim 1, wherein the first logical address is a same logical address as the second logical address.

3. The method of claim 1, further comprising:
receiving a write operation to write new data to the second logical address of the second device;
storing said new data at a third physical storage location; and
mapping said second logical address to said third physical storage location.

4. The method of claim 3, wherein said new data has a size less than a predetermined size of said second data portion and the method includes storing said second data portion at said third physical storage location and then overwriting said new data onto said second data portion at said third physical storage location.

5. The method of claim 1, further comprising:
receiving a read operation to read data of said second logical address of said second device;
retrieving the second data portion to service said read operation, said retrieving including:
using said first pointer mapping said second logical address of said second device to the first logical address of the first device to obtain said second pointer; and
using said second pointer to obtain said third logical address that is mapped to said same physical storage location storing the second data portion which is a duplicate of data of said first data portion.

6. The method of claim 1, further comprising:
receiving a first read operation to read data of said first logical address of said first device; and
retrieving the first data portion to service said first read operation using said second pointer whereby said second pointer is used to obtain said third logical address that is mapped to said same physical storage location storing the data contents of the first data portion.

7. The method of claim 1, wherein the method includes performing first processing to determine that a third data portion stored at a fourth logical address of the first logical address space of the first device is a duplicate of data contents of a fourth data portion stored at a fifth logical address of the second logical address space of the second device, the first processing comprising:
receiving hint information indicating that the third data portion stored at said fourth logical address of said first device is a duplicate of data contents of said fourth data portion stored at the fifth logical address of the second device; and
performing processing using the hint information to store said third data portion and said fourth data portion at a same physical storage location.

8. The method of claim 7, wherein the first processing includes:
determining a first token value uniquely identifying said third data portion;
determining a second token value uniquely identifying said fourth data portion; and
comparing said first token value and said second token value to determine whether the third data portion is a duplicate of the fourth data portion.

9. The method of claim 7, wherein the method further comprises:
receiving hint information indicating that the third data portion and the fourth data portion are candidates likely to be redundant data portions including the same data content; and
performing processing using the hint information to determine whether the third data portion and the fourth data portion contain the same data content and, if so, storing the same data contents of said third data portion and said fourth data portion at a same physical storage location.

10. A method for relocating data from a first device to a second device comprising:
storing a first data portion at a first logical address of a first logical address space of a first device, wherein said first logical address is mapped to a first physical storage location on a first physical storage device at which the first data portion is stored, wherein said first device is a thin device having a first storage capacity and wherein storage is unallocated for at least a first portion of said first storage capacity at a point in time, said first portion corresponding to a range of addresses of said first logical address space not mapped to physical storage; and
receiving a command to copy said first data portion to a second logical address of a second logical address space of a second device, wherein copying said first data portion to said second logical address on the second device includes mapping said second logical address to said first physical storage location, said second device being a thin device having a second storage capacity and wherein storage is unallocated for at least a second portion of said second storage capacity at a point in time, said second portion corresponding to a range of addresses of said second logical address space not mapped to physical storage, wherein said first data portion of the first device is used by a virtual machine having data of the virtual machine relocated to the second device, and
wherein, prior to receiving the command to copy the first data portion, the virtual machine is executing on a first processor of a first data storage system including the first physical storage device, said first physical storage device including the first physical storage location, and the method includes:
relocating the virtual machine from the first data storage system to execute on a second processor of a second data storage system, said relocating including issuing said command to copy said first data portion to the second logical address on the second device, wherein, after performing said relocating, said virtual machine executes on said second processor and accesses said first data portion stored at the first physical storage location on the first physical storage device of the first data storage system using said second device.

11. The method of claim 10, further comprising:
deallocating the first data portion of the first device, said deallocating including unmapping said first logical address from said first physical storage location.

12. A non-transitory computer readable medium comprising code stored thereon for performing data storage management, the non-transitory computer readable medium comprising code for:
storing a first data portion at a first logical address of a first logical address space of a first device, wherein said first logical address is mapped to a first physical storage location at which the first data portion is stored, wherein said first device is a thin device having a first storage capacity and wherein storage is unallocated for at least a first portion of said first storage capacity at a point in time, said first portion corresponding to a range of addresses of said first logical address space not mapped to physical storage; and
storing a second data portion at a second logical address of a second logical address space of a second device, wherein said second logical address is mapped to a second physical storage location at which the second data portion is stored, and wherein said first data portion is a duplicate of data contents of said second data portion and said first physical storage location is a same physical storage location as said second physical storage location, wherein said second device is a thin device different from the first device having a second storage capacity and wherein storage is unallocated for at least a second portion of said second storage capacity at a point in time, said second portion corresponding to a range of addresses of said second logical address space not mapped to physical storage, and
wherein said first device is a source thin device and said second device is a target thin device that is a snapshot of the source thin device created at a first point in time in response to a command to create the snapshot, and wherein said second logical address of the second device is mapped to said first logical address of the first device by a first pointer and wherein said first logical address is mapped to a third logical address of a third logical device by a second pointer whereby said third logical address is mapped to said same physical storage location storing the data contents of the first data portion and the second data portion.

13. The non-transitory computer readable medium of claim 12, wherein the first logical address is a same logical address as the second logical address.

14. The non-transitory computer readable medium of claim 12, further comprising code for:
receiving a write operation to write new data to the second logical address of the second device;
storing said new data at a third physical storage location; and mapping said second logical address to said third physical storage location.

\* \* \* \* \*